United States Patent
Noh et al.

(10) Patent No.: US 11,245,560 B2
(45) Date of Patent: Feb. 8, 2022

(54) METHOD AND APPARATUS FOR TRANSMITTING AND RECEIVING MULTIPLE DATA IN WIRELESS COOPERATIVE COMMUNICATION SYSTEM

(71) Applicant: Samsung Electronics Co., Ltd., Suwon-si (KR)

(72) Inventors: Hoondong Noh, Suwon-si (KR); Hyoungju Ji, Suwon-si (KR); Jinhyun Park, Suwon-si (KR); Heecheol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 16/832,547

(22) Filed: Mar. 27, 2020

(65) Prior Publication Data

US 2020/0313947 A1 Oct. 1, 2020

(30) Foreign Application Priority Data

Mar. 28, 2019 (KR) .......................... 10-2019-0036017
May 16, 2019 (KR) .......................... 10-2019-0057733

(51) Int. Cl.
*H04L 27/26* (2006.01)
*H04L 27/32* (2006.01)
*H04W 72/04* (2009.01)
*H04L 5/00* (2006.01)
*H04W 76/27* (2018.01)

(52) U.S. Cl.
CPC ........ *H04L 27/2613* (2013.01); *H04L 5/0051* (2013.01); *H04L 5/0082* (2013.01);
(Continued)

(58) Field of Classification Search
CPC ... H04L 27/32; H04L 27/2613; H04L 5/0051; H04L 5/0082; H04W 76/27; H04W 72/042
See application file for complete search history.

(56) References Cited

U.S. PATENT DOCUMENTS

2018/0278395 A1* 9/2018 Yoon ................... H04L 27/2613
2019/0068308 A1 2/2019 Shin et al.
(Continued)

FOREIGN PATENT DOCUMENTS

WO 2018/038556 A1 3/2018

OTHER PUBLICATIONS

Qualcomm Incorporated, 'Multi-TRP Enhancements', R1-1903043, 3GPP TSG-RAN WG1 Meeting #96, Athens, Greece, Feb. 16, 2019, section 2.1.

(Continued)

*Primary Examiner* — Wei Zhao
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. Methods and apparatuses for exchanging configuration information related to a demodulation reference signal (DMRS) are provided, and particularly, for providing DMRS ports included in a different code division multiplexing group for communication between a terminal and a base station.

20 Claims, 16 Drawing Sheets

(52) U.S. Cl.
CPC .......... *H04L 27/32* (2013.01); *H04W 72/042* (2013.01); *H04W 76/27* (2018.02)

(56) References Cited

U.S. PATENT DOCUMENTS

| | | | |
|---|---|---|---|
| 2019/0190673 A1 | 6/2019 | Kwak et al. | |
| 2020/0112411 A1* | 4/2020 | Khoshnevisan | ...... H04L 5/0051 |
| 2020/0154467 A1* | 5/2020 | Gong | ................... H04W 24/08 |

OTHER PUBLICATIONS

Huawei et al., 'Summary of AI: 7.28.2 Enhancements on Multi-TRP/Panel Transmission of Offline Discussion', R1-1903541, 3GPP TSG Ran WG1 Meeting #96, Athens, Greece, Feb. 27, 2019, sections 2-4.

Qualcomm, 'Summary of DMRS Issues', R1-1811838, 3GPP TSG RAN WG1 Meeting #94bis, Chengdu, China, Oct. 9, 2018, sections 1, 6-7.

Samsung, 'CR on UE demodulation and CSI requirements for 38.101-4', R4-1902614, 3GPP TSG-RAN4 Meeting #90, Athens, GR, Mar. 11, 2019, sections 5.2-5.5.A; and table 5.5A-1.

International Search Report and Written Opinion dated Jul. 2, 2020, issued in International Patent Application No. PCT/KR2020/004334.

3GPP TS 38.211 V15.1.0, "3rd Generation Partnership Project; Technical Specification Group Radio Access Network; NR; Physical channels and modulation (Release 15)", Mar. 2018.

* cited by examiner

METHOD AND APPARATUS FOR TRANSMITTING AND RECEIVING MULTIPLE DATA IN WIRELESS COOPERATIVE COMMUNICATION SYSTEM

CROSS-REFERENCE TO RELATED APPLICATION(S)

This application is based on and claims priority under 35 U.S.C. § 119(a) of a Korean patent application number 10-2019-0036017, filed on Mar. 28, 2019, in the Korean Intellectual Property Office, and of a Korean patent application number 10-2019-0057733, filed on May 16, 2019, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for transmitting and receiving multiple data in a wireless cooperative communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, a method for transmitting and receiving data for network cooperative communication is required along with the development of wireless communication systems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provides a method and an apparatus for transmitting and receiving multiple data between a transmission node and a terminal in order to perform cooperative communication in a wireless communication system.

Another aspect of the disclosure is to provide a terminal and a base station that are capable of efficiently transmitting and receiving multiple data in a wireless communication system.

Additional aspects will be set forth in part in the description which follows and, in part, will be apparent from the description, or may be learned by practice of the presented embodiments.

In accordance with an aspect of the disclosure, a method of a terminal is provided. The method includes receiving, from a base station, configuration information associated with a demodulation reference signal (DMRS) for receiving data, receiving, from the base station, control information including an indicator corresponding to at least one DMRS port, identifying a DMRS port allocated to the terminal based on the configuration information and the control information, and receiving, from the base station, data based on the identified DMRS port, wherein, in case that the indicator corresponds to a plurality of DMRS ports, the plurality of DMRS ports includes at least two DMRS ports included in a different code division multiplexing (CDM) group.

In accordance with another aspect of the disclosure, a method of a base station is provided. The method includes transmitting, to a terminal, configuration information associated with a demodulation reference signal (DMRS) for receiving data, transmitting, to the terminal, control information including an indicator corresponding to at least one DMRS port, identifying a DMRS port allocated to the terminal based on the configuration information and the control information, and transmitting, to the terminal, data based on the identified DMRS port, wherein in case that the indicator corresponds to a plurality of DMRS ports, the plurality of DMRS ports includes at least two DMRS ports included in a different code division multiplexing (CDM) group.

In accordance with another aspect of the disclosure, a terminal is provided. The terminal includes a transceiver and a processor configured to receive, from a base station via the transceiver, configuration information associated with a demodulation reference signal (DMRS) for receiving data, receive, from the base station via the transceiver, control information including an indicator corresponding to at least one DMRS port, identify a DMRS port allocated to the terminal based on the configuration information and the control information, and receive, from the base station via the transceiver, data based on the identified DMRS port, wherein, in case that the indicator corresponds to a plurality of DMRS ports, the plurality of DMRS ports includes at least two DMRS ports included in a different code division multiplexing (CDM) groups.

In accordance with another aspect of the disclosure, a base station is provided. The base station includes a transceiver and a processor configured to transmit, to a terminal via the transceiver, configuration information associated with a demodulation reference signal (DMRS) for receiving data, transmit, to the terminal via the transceiver, control information including an indicator corresponding to at least one DMRS port, identify a DMRS port allocated to the terminal based on the configuration information and the control information, and transmit, to the terminal, data based on the identified DMRS port, wherein in case that the indicator corresponds to a plurality of DMRS ports, the plurality of DMRS ports includes at least two DMRS ports included in a different code division multiplexing (CDM) group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
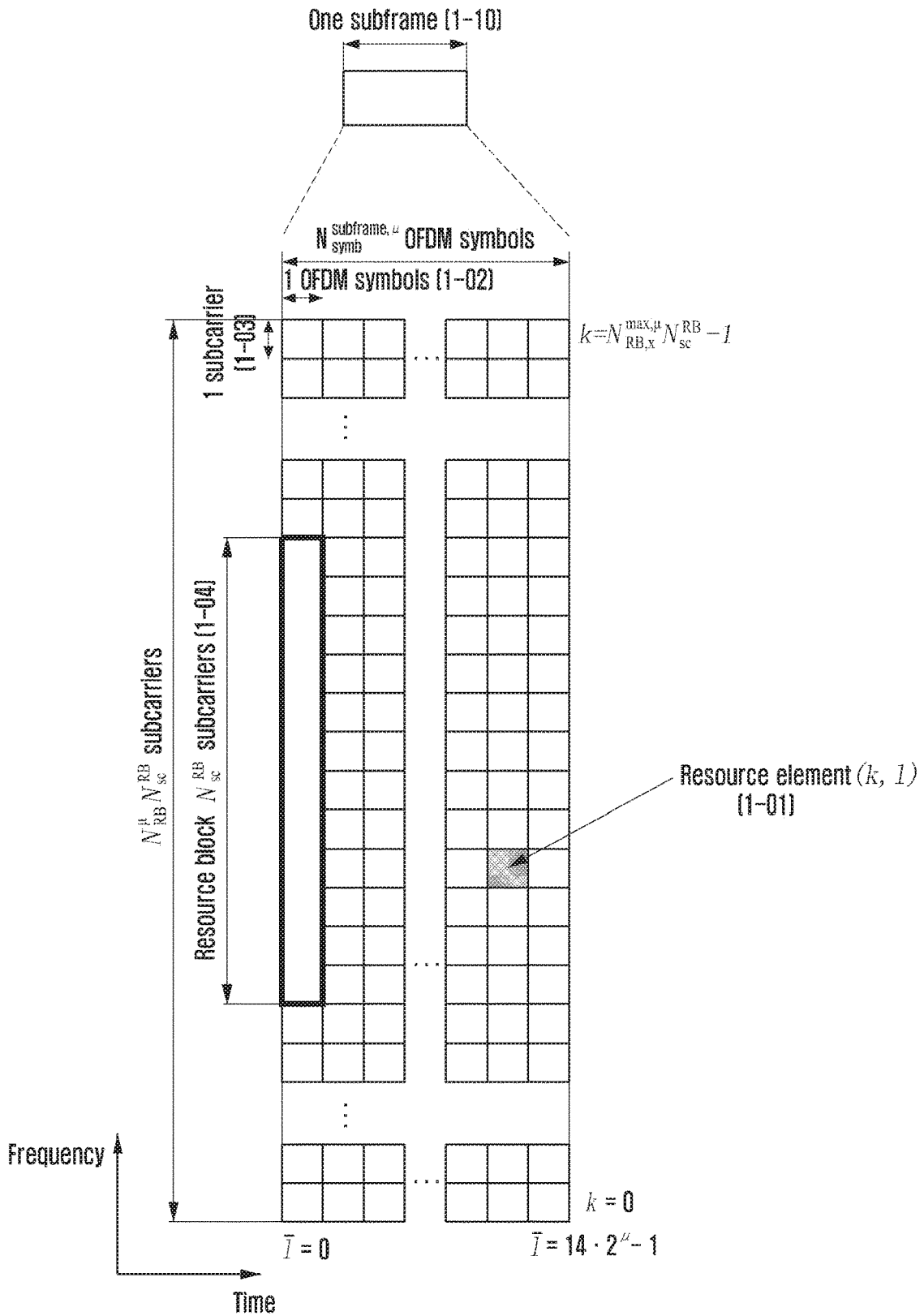
FIG. 1 is a diagram illustrating a time-frequency domain transmission structure in long-term evolution (LTE) {evolved universal terrestrial radio access (E-UTRA)}, LTE-Advanced (LTE-A), new radio (NR), or a wireless communication system similar thereto according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms. Hereinafter, the base station is an entity for performing resource allocation to the terminal, and may be at least one of a gNode B, an eNode B, a Node B, a base station (BS), a wireless access unit, a base station controller, or a node in a network. The terminal may include a user equipment (UE), a mobile station (MS), a cellular phone, a smartphone, a computer, or a multimedia system capable of performing communication functions. The base station and the terminal are not limited to the above examples. Hereinafter, the disclosure describes a technique for a terminal to receive broadcast information from a base station in a wireless communication system. The disclosure relates to a communication technique for merging, with IoT (Internet of Things) technology, a 5G ($5^{th}$ generation) communication system for supporting a higher data rate, subsequent to a 4G ($4^{th}$ generation) system, and a system thereof. The disclosure may be applied to an intelligent service (for example, smart home, smart building, smart city, smart car or connected car, healthcare, digital education, retail, security and safety-related services, and the like), based on a 5G communication technology and an IoT-related technology.

In the following description, terms referring to broadcast information, terms referring to control information, terms referring to communication coverage, terms referring to a change in the state (e.g., event), terms referring to network entities, terms referring to messages, terms referring to elements of a device, and the like are illustrative words for the convenience of explanation. Accordingly, the disclosure is not limited to the terms described below, and other terms having equivalent technical meanings may be used.

Hereinafter, terms and names defined in the 3rd-generation partnership project long-term evolution (3GPP LTE) standard will be used for the convenience of explanation.

However, the disclosure is not limited to the above terms and names, and may be applied to systems conforming to other standards in the same manner.

The wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link through which the terminal {user equipment (UE) or mobile station (MS)} transmits data or control signals to the base station (BS) (eNode B), and downlink refers to a radio link through which the base station transmits data or control signals to the terminal. The above multiple access scheme separates data or control information of the respective users by allocating and operating time-frequency resources to transmit the data or control information for each user so as to avoid overlapping each other (that is, so as to establish orthogonality).

Since a 5G communication system, which is a communication system subsequent to LTE, must freely reflect various requirements of users, service providers, and the like, services satisfying various requirements must be supported. The services considered for the 5G communication system include enhanced mobile broadband (eMBB) communication, massive machine-type communication (mMTC), ultra-reliability low-latency communication (URLLC), and the like.

According to some embodiments, the eMBB aims at providing a data rate higher than that supported by existing LTE, LTE-A, or LTE-Pro. For example, in the 5G communication system, the eMBB must provide a peak data rate of 20 Gbps in the downlink and a peak data rate of 10 Gbps in the uplink for a single base station. Furthermore, the eMBB must provide an increased user perceived data rate to the terminal. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of the band of 2 GHz used in the current LTE.

In addition, mMTC is being considered to support application services such as the Internet of Things (IoT) in the 5G system. The mMTC has requirements, such as support of connection of large numbers of terminals in the cell, enhancement of the terminal coverage, improved battery time, and a reduction in the cost of a terminal, in order to effectively provide the Internet of Things. Since the Internet of Things provides communication functions while being provided to various sensors and various devices, it must support a large number of terminals (e.g., 1,000,000 terminals/km2) in the cell. In addition, the terminals supporting the mMTC may require wider coverage than those of other services provided by the 5G communication system because the terminals are likely to be located in a shadow area, such as a basement of a building, which is not covered by a cell due to the nature of the service. The terminals supporting the mMTC is required to be configured to be inexpensive, and may require a very long battery life time because it is difficult to frequently replace the battery of the terminal.

Lastly, the URLLC, which is a cellular-based mission-critical wireless communication service, is used for remote control for robots or machines, industrial automation, unmanned aerial vehicles, remote health care, emergency alert, or the like, and must provide communication with ultra-low latency and ultra-reliability. For example, a service supporting the URLLC must satisfy an air interface latency of less than 0.5 ms, and also requires a packet error rate of 10-5 or less. Therefore, for the services supporting the URLLC, the 5G system must provide a transmit time interval (TTI) shorter than those of other services, and also requires a design for allocating large amount of resources in the frequency band. However, the above-mentioned mMTC, URLLC, and eMBB are only examples of different types of services, and the disclosure is not limited to the types of services described above.

The above-mentioned services considered in the 5G communication system must converge to a single framework to then be provided. That is, the respective services are preferably integrated into a single system to then be controlled and transmitted, instead of operating the services independently, for efficient resource management and control.

In addition, although the embodiments of the disclosure will be described below by way of example as LTE, LTE-A, LTE-Pro, or NR systems, the embodiments of the disclosure are able to be applied to other communication systems having similar technical backgrounds or channel forms. Further, the embodiments of the disclosure are able to be applied to other communication systems through some modifications thereof without departing from the scope of the disclosure according to judgment by those skilled in the art.

The disclosure relates to a method and an apparatus for repeatedly transmitting data and control signals between a plurality of transmission nodes and terminals performing cooperative communication to improve communication reliability.

According to the disclosure, in the case where network cooperative communication is used in a wireless communication system, the reliability of data/control signals received by the terminal is able to be improved.

Hereinafter, a frame structure of a 5G system will be described in more detail with reference to the accompanying drawings.

FIG. 1 is a diagram illustrating the time-frequency domain transmission structure of a subframe 1-10 of LTE, LTE-A, NR, or wireless communication systems similar thereto according to an embodiment of the disclosure.

Referring to FIG. 1, FIG. 1 shows a basic structure of a time-frequency domain that is a wireless resource domain for transmitting data or control channels in a 5G system. Referring to FIG. 1, the horizontal axis represents a time domain, and the vertical axis represents a frequency domain. The basic unit of a resource in the time-frequency domain is a resource element (RE) 1-01, which may be defined as one orthogonal frequency division multiplexing (OFDM) symbol 1-02 on the time axis and one subcarrier 1-03 on the frequency axis. Consecutive $N\_sc^{RB}$ (e.g., 12) REs may constitute one resource block (RB) 1-04 in the frequency domain.

Figure 2:
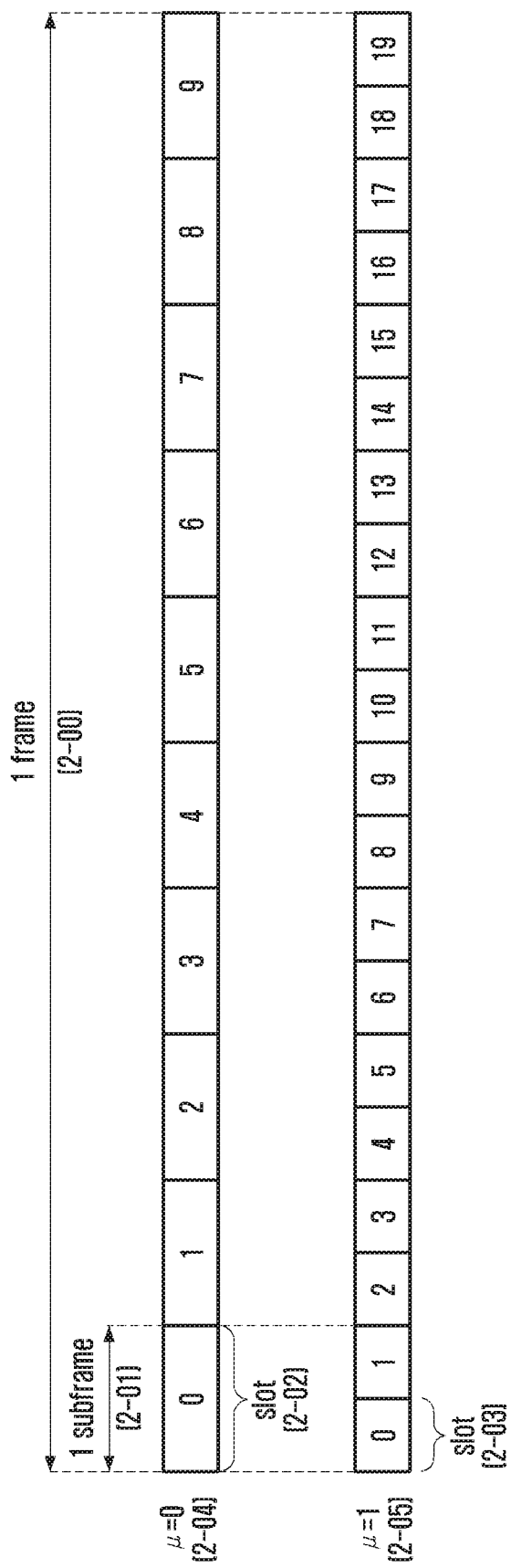
FIG. 2 is a diagram illustrating the structure of a frame, a subframe, and a slot in 5G (5$^{th}$ generation) according to an embodiment of the disclosure.

FIG. 2 is a diagram illustrating a slot structure considered in a 5G system according to an embodiment of the disclosure.

Referring to FIG. 2, FIG. 2 illustrates an example of the structure of a frame 2-00, a subframe 2-01, and a slot 2-02.

One frame 2-00 may be defined as 10 ms. One subframe 2-01 may be defined as 1 ms, and thus, one frame 2-00 may include a total of 10 subframes 2-01. One slot 2-02 or 2-03 may be defined as 14 OFDM symbols {that is, the number of symbols per slot ($N_{symb}^{slot}$)=14}. One subframe 2-01 may include one or more slots 2-02 and 2-03, and the number of slots 2-02 and 2-03 for each subframe 2-01 may vary depending on a configuration value μ of subcarrier spacing 2-04 or 2-05. The example in FIG. 2 shows the case of μ=0 (2-04) and the case of μ=1 (2-05) as a configuration value of subcarrier spacing. In the case of μ=0 (2-04), one subframe 2-01 may include one slot 2-02, and in the case of μ=1 (2-05), one subframe 2-01 may include two slots 2-03. That is, the number of slots for each subframe ($N_{slot}^{subframe,\mu}$) may vary depending on the configuration value μ of subcarrier spacing, and the number of slots for each frame ($N_{slot}^{frame,\mu}$) may vary according thereto. $N_{slot}^{subframe,\mu}$ and $N_{slot}^{frame,\mu}$ according to each configuration value μ of subcarrier spacing may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs. Therefore, in the case where a terminal always receives signals through the overall bandwidth of a serving cell, such as LTE, there may be a large amount of power consumption by the terminal, and in order to solve this problem, the base station may configure one or more bandwidth parts (BWPs) for the terminal such that the terminal may change the reception area in the cell.

In NR, the base station may configure an "initial BWP", which is the bandwidth of control resource set (CORESET) #0 {or common search space (CSS)}, for the terminal through an MIB. Thereafter, the base station may configure an initial BWP (first BWP) of the terminal through radio resource control (RRC) signaling, and may transmit a notification of one or more pieces of BWP configuration information that may be indicated through downlink control information (DCI) later. Afterwards, the base station may transmit a BWP ID through DCI, thereby indicating the band to be used by the terminal. If the terminal does not receive the DCI in the currently allocated BWP for a specific period of time or more, the terminal returns to a "default BWP" and attempts to receive the DCI.

Figure 3:
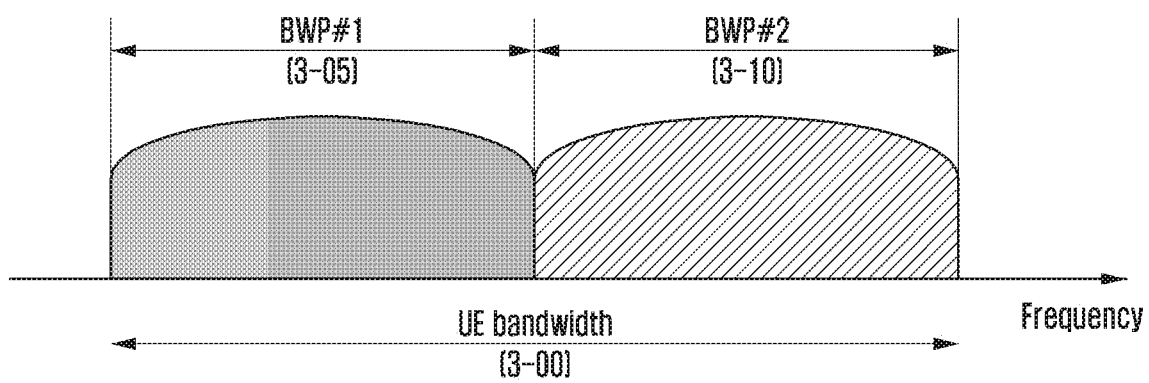
FIG. 3 illustrates an example of configuration of a bandwidth part (BWP) in a wireless communication system according to an embodiment of the disclosure.

FIG. 3 illustrates an example of configuration of a bandwidth part (BWP) in a wireless communication system according to an embodiment of the disclosure.

FIG. 3 is a diagram illustrating an example of configuration of a bandwidth part in a 5G communication system.

Referring to FIG. 3, FIG. 3 illustrates an example in which a UE bandwidth 3-00 is configured to have two bandwidth parts, that is, bandwidth part #1 (3-05) and bandwidth part #2 (3-10). The base station may configure one or more bandwidth parts for the terminal, and may configure information on each bandwidth part as shown in Table 2 below.

TABLE 2

| Configuration information 1 | Bandwidth of bandwidth part (number of PRBs constituting bandwidth part) |
|---|---|
| Configuration information 2 | Frequency location of bandwidth part (This information may be offset value compared to reference point. Reference point may be, for example, center frequency of carrier, synchronization signal, synchronization signal raster, etc.) |
| Configuration information 3 | Numerology of bandwidth part (e.g., subcarrier spacing, cyclic prefix length, etc.) |
| Others | |

In addition to the configuration information described in Table 2, various parameters related to the bandwidth part may be configured for the terminal. The base station may transmit the above information to the terminal through higher layer signaling, for example, RRC signaling. At least one of the configured bandwidth parts may be activated. Information on whether or not to activate the configured bandwidth part may be transmitted from the base station to the terminal semi-statically through RRC signaling or dynamically through a MAC control element (CE) or DCI.

The configuration of the bandwidth part supported by the above-described 5G communication system may be used for various purposes.

For example, in the case where the bandwidth supported by the terminal is smaller than the system bandwidth, the bandwidth supported by the terminal may be supported by configuring the bandwidth part. For example, in Table 2, the frequency location (configuration information 2) of the bandwidth part may be configured for the terminal, so that the terminal may transmit and receive data in a specific frequency location within a system bandwidth.

As another example, the base station may configure a plurality of bandwidth parts for the terminal for the purpose of supporting different numerologies. For example, in order to support a certain terminal to transmit and receive data using both a subcarrier spacing of 15 kHz and a subcarrier spacing of 30 kHz, two bandwidth parts may be configured so as to use subcarrier spacing of 15 kHz and 30 kHz, respectively. Different bandwidth parts may be frequency-division-multiplexed (FDM), and in the case where data is to be transmitted and received in a specific subcarrier spacing, the bandwidth part configured as the corresponding subcarrier spacing may be activated.

Figure 4:
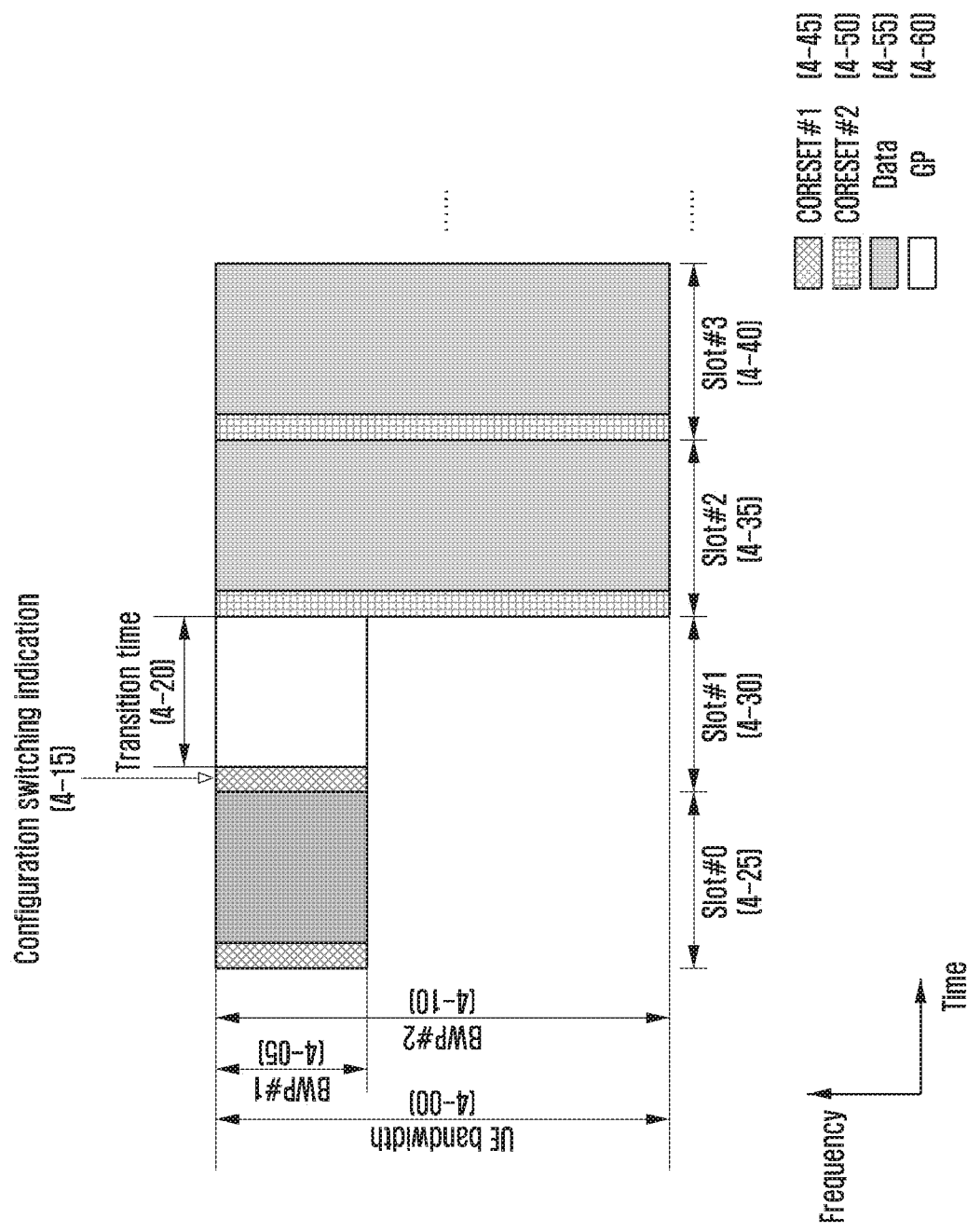
FIG. 4 is a diagram illustrating an example of indication and switching of a bandwidth part in a wireless communication system according to an embodiment of the disclosure.

As another example, the base station may configure a bandwidth part having different bandwidths for the terminal for the purpose of reducing power consumption by the terminal. For example, if the terminal supports a very large bandwidth, e.g., a bandwidth of 100 MHz, and transmits and receives data only in the corresponding bandwidth, it may cause a large amount of power consumption. In particular, in terms of power consumption, it is very inefficient for the terminal to monitor an unnecessary downlink control channel for a large bandwidth of 100 MHz in the absence of traffic. Therefore, in order to reduce power consumption by the terminal, the base station may configure a bandwidth part having a relatively small bandwidth, for example, a 20 MHz bandwidth part, for the terminal. The terminal may perform a monitoring operation in a 20 MHz bandwidth part in the absence of traffic, and if data is produced, the terminal may transmit and receive data using a 100 MHz bandwidth part according to the indication from the base station. FIG. 4 is a diagram illustrating an example of indication and switching of a bandwidth part in a wireless communication system according to an embodiment.

FIG. 4 is a diagram illustrating a method of dynamically changing the configuration of a bandwidth part according to an embodiment of the disclosure.

Referring to FIG. 4, as described in Table 2 above, the base station may configure one or more bandwidth parts for the terminal, and may transmit, to the terminal, information on the bandwidth of the bandwidth part, the frequency location of the bandwidth part, numerology of the bandwidth part, or the like, as the configuration for each bandwidth part.

FIG. 4 illustrates an example in which two bandwidth parts, i.e., bandwidth part #1 (BPW #1) 4-05 and bandwidth part #2 (BWP #2) 4-10 are configured within a terminal bandwidth 4-00 for a terminal.

One or more bandwidth parts may be activated in the configured bandwidth, and an example in which one bandwidth part is activated will be considered in FIG. 4. In FIG. 4, the bandwidth part #1 (4-05) is in an active state among the bandwidth parts configured in slot #0 (4-25), and the terminal may monitor a physical downlink control channel (PDCCH) in a control resource set #1 (4-45) configured in bandwidth part #1 (4-05), and may transmit and receive data 4-55 in bandwidth part #1 (4-05). The control resource set in which the terminal monitors the PDCCH may be different according to the bandwidth part that is activated among the configured bandwidth parts, and the bandwidth in which the terminal monitors the PDCCH may vary according thereto.

The base station may further transmit, to the terminal, an indicator for switching the configuration of the bandwidth part. "Switching" the configuration of the bandwidth part may be regarded as the operation of activating a specific bandwidth part (for example, switching the activation from bandwidth part A to bandwidth part B). The base station may transmit a configuration switching indicator to the terminal in a specific slot, and the terminal may receive the configuration switching indicator from the base station, may then apply the configuration changed according to the configuration switching indicator at a specific time to determine the bandwidth part to be activated, and may monitor the PDCCH in the control resource set configure in the activated bandwidth part.

In FIG. 4, the base station may transmit, to the terminal, a configuration switching indicator 4-15 for instructing the terminal to switch the activated bandwidth part from existing bandwidth part #1 (4-05) to bandwidth part #2 (4-10) in slots #1 (4-30). Upon receiving the indicator, the terminal may activate bandwidth part #2 (4-10) according to the content of the indicator. In this case, a transition time 4-20 for switching the bandwidth part may be required, and the time for switching and applying the bandwidth part to be activated may be determined according thereto.

FIG. 4 illustrates the case in which a transition time 4-20 of one slot elapses after receiving the configuration switching indicator 4-15. Data may not be transmitted and received during the transition time 4-20 (4-60). Accordingly, bandwidth part #2 (4-10) is activated in slot #2 (4-35), so that control channels and data may be transmitted and received in the corresponding bandwidth part.

The base station may preconfigure one or more bandwidth parts for the terminal using higher layer signaling (e.g., RRC signaling), and may indicate activation in such a manner that the configuration switching indicator 4-15 is mapped to one of the bandwidth parts preconfigured by the base station. For example, the indicator of $\log_2 N$ bits may indicate to select one of N preconfigured bandwidth parts.

An example of indicating configuration information on a bandwidth part using a 2-bit indicator is shown in Table 3 below.

TABLE 3

| Indicator values | Bandwidth part configuration |
| --- | --- |
| 00 | Bandwidth configuration A configured through higher layer signaling |
| 01 | Bandwidth configuration B configured through higher layer signaling |
| 10 | Bandwidth configuration C configured through higher layer signaling |
| 11 | Bandwidth configuration D configured through higher layer signaling |

The configuration switching indicator 4-15 for the bandwidth part described in FIG. 4 may be transmitted from the base station to the terminal using medium access control (MAC) control element (CE) signaling or L1 signaling (e.g., common DCI, group-common DCI, or terminal-specific DCI).

According to the configuration switching indicator 4-15 for the bandwidth part described in FIG. 4, the time at which activation of the bandwidth part is applied may be determined as follows. The time at which switching of the configuration is applied may follow a predefined value (e.g., applying the switching of the configuration N (=1) slots after receiving the configuration switching indicator), may be configured by the base station for the terminal using higher layer signaling (e.g., RRC signaling), or may be included, in part, in the content of the configuration switching indicator 4-15 to then be transmitted. Alternatively, the time at which switching of the configuration is applied may be determined by a combination of the above-described methods. After receiving the configuration switching indicator 4-15 for the bandwidth part, the terminal may apply the switched configuration from the time obtained by the above-described methods.

Hereinafter, a downlink control channel in a 5G communication system will be described in more detail with reference to the accompanying drawings.

Figure 5:
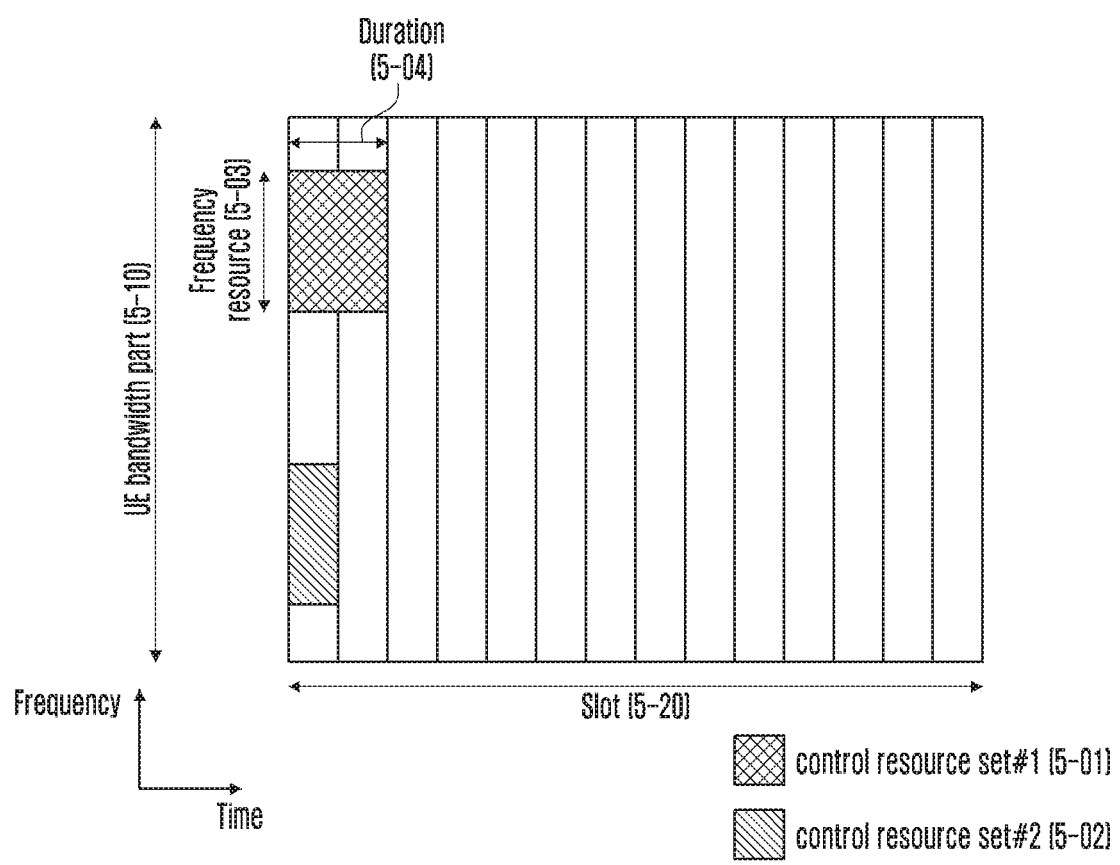
FIG. 5 is a diagram illustrating an example of a control resource set configuration in a downlink control channel in a wireless communication system according to an embodiment of the disclosure.

FIG. 5 is a diagram illustrating an example of a control resource set configuration in a downlink control channel in a wireless communication system according to an embodiment.

FIG. 5 is a diagram illustrating an example of a control resource set (CORESET) in which a downlink control channel is transmitted in a 5G wireless communication system according to an embodiment of the disclosure.

Referring to FIG. 5, FIG. 5 illustrates an example in which two control resource sets {control resource set #1 (5-01) and control resource set #2 (5-02)} are configured in a UE bandwidth part 5-10 on the frequency axis and one slot 5-20 on the time axis.

The control resource set 5-01 or 5-02 may be configured in a specific frequency resource 5-03 within the entire UE bandwidth part 5-10 on the frequency axis. The control resource set 5-01 or 5-02 may be configured using one or more OFDM symbols on the time axis, and may be defined as control resource set duration 5-04. In the example shown in FIG. 5, control resource set #1 (5-01) is configured to have control resource set duration of two symbols, and control resource set #2 (5-02) is configured to have control resource set duration of one symbol.

The control resource sets in 5G described above may be configured for the terminal by the base station through higher layer signaling {e.g., system information, a master information block (MIB), or radio resource control (RRC) signaling). Configuring the control resource set for the terminal means providing the terminal with information such as a control resource set identity, the frequency location of the control resource set, the symbol duration of the control resource set, and the like. For example, the information may include items shown in Table 4.

TABLE 4

```
ControlResourceSet ::=            SEQUENCE {
 -- Corresponds to L1 parameter 'CORESET-ID'
 controlResourceSetId             ControlResourceSetId,
  (제어영역 식별자 (Identity))
 frequencyDomainResources         BIT STRING (SIZE (45)),
  (주파수 축 자원할당 정보)
 duration                         INTEGER (1..maxCoReSetDuration),
  (시간 축 자원할당 정보)
 cce-REG-MappingType              CHOICE {
  (CCE-to-REG 매핑 방식)
   interleaved                    SEQUENCE {
    reg-BundleSize                  ENUMERATED {n2, n3, n6},
     (REG 번들 크기)
    precoderGranularity           ENUMERATED
                                    {sameAsREG-bundle,
    allContiguousRBs},
    interleaverSize               ENUMERATED {n2, n3, n6}
     (인터리버 크기)
    shiftIndex
     INTEGER(0..maxNrofPhysicalResoureBlocks-1)
     (인터리버 쉬프트 (Shift))
    },
   nonInterleaved                 NULL
  },
 tci-StatesPDCCH                  SEQUENCE (SIZE
  (1..maxNrofTCI-StatesPDCCH)) OF TCI-StateId    OPTIONAL,
  (QCL 설정 정보)
 tci-PresentInDCI                 ENUMERATED {enabled}
}
```

In Table 4, "tci-StatesPDCCH" (simply referred to as "transmission configuration indication (TCI) state") configuration information includes information on one or more synchronization signals (SS)/physical broadcast channel (PBCH) block indexes or channel state information reference signal (CSI-RS) indexes having a QCL (quasi co-located) relationship with a demodulation reference signal (DMRS) transmitted in the corresponding control resource set.

Now, methods for allocating time and frequency resources for transmission of data in NR will be described.

NR may provide detailed frequency domain resource allocation (FD-RA) methods as follows, in addition to frequency domain resource candidate allocation through BWP indication.

Figure 6:
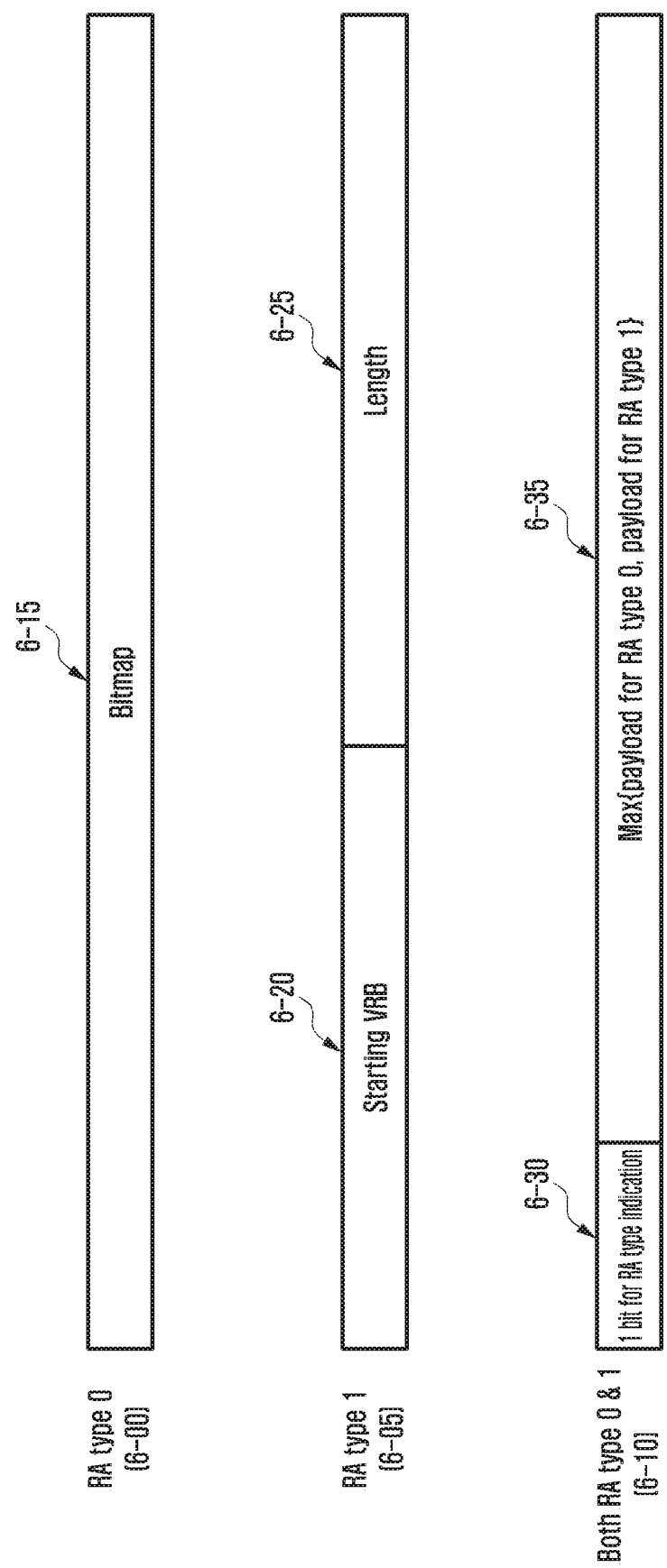
FIG. 6 is a diagram illustrating an example of physical downlink shared channel (PDSCH) frequency domain resource allocation in a wireless communication system according to an embodiment of the disclosure.

FIG. 6 is a diagram illustrating an example of PDSCH frequency domain resource allocation in a wireless communication system according to an embodiment of the disclosure.

FIG. 6 illustrates three frequency domain resource allocation methods of type 0 (6-00), type 1 (6-05), and dynamic switch 6-10, which may be configured through a higher layer in NR.

Referring to FIG. 6, in the case where a terminal is configured to use only resource type 0 through higher layer signaling (6-00), some downlink control information (DCI) for allocating PDSCHs to the terminal has a bitmap of NRBG bits. The conditions for this will be described later. In this case, NRBG indicates the number of resource block groups (RBGs) determined, as shown in Table 5 below, according to the size of a BWP allocated by a BWP indicator and the higher layer parameter "rbg-Size", and data is transmitted in the RBG represented as "1" using a bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the case where the terminal is configured to use only resource type 1 through higher layer signaling (6-05), some DCI for allocating PDSCHs to the terminal has frequency domain resource allocation information including $\lceil \log_2 (N_{RB}^{DLBWP}(N_{RB}^{DLBWP}+1)/2) \rceil$ bits. The conditions for this will be described again later. The base station may configure starting VRB 6-20 and the length 6-25 of the frequency domain resource subsequent thereto.

If the terminal is configured to use both resource type 0 and resource type 1 through higher layer signaling (6-10), some DCI for allocating the PDSCHs to the corresponding terminal has frequency domain resource allocation information including bits of a large value 6-35 among the payload 6-15 for configuring resource type 0 and the payloads 6-20 and 6-25 for configuring resource type 1. The conditions for this will be described again later. In this case, one bit may be added to the foremost part (MSB) of the frequency domain resource allocation information in the DCI, and bit 0 indicates that resource type 0 is used, and bit 1 indicates that resource type 1 is used.

Figure 7:
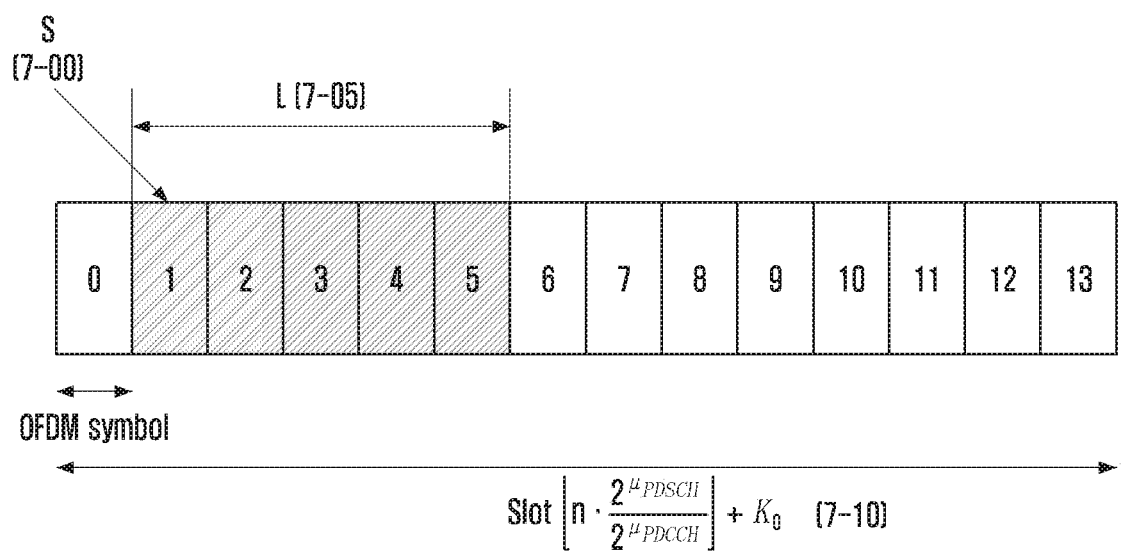
FIG. 7 is a diagram illustrating an example of PDSCH time domain resource allocation in a wireless communication system according to an embodiment of the disclosure.

FIG. 7 is a diagram illustrating an example of PDSCH time domain resource allocation in a wireless communication system according to an embodiment of the disclosure.

Referring to FIG. 7, the base station may indicate the time domain location of a PDSCH resource according to subcarrier spacing (SCS) ($\mu_{PDSCH}$ and $\mu_{PDCCH}$) of a data channel and a control channel configured using a higher layer, a scheduling offset value ($K_0$), the starting location 7-00 of OFDM symbols in one slot dynamically indicated through DCI, and the length 7-05 thereof.

Figure 8:
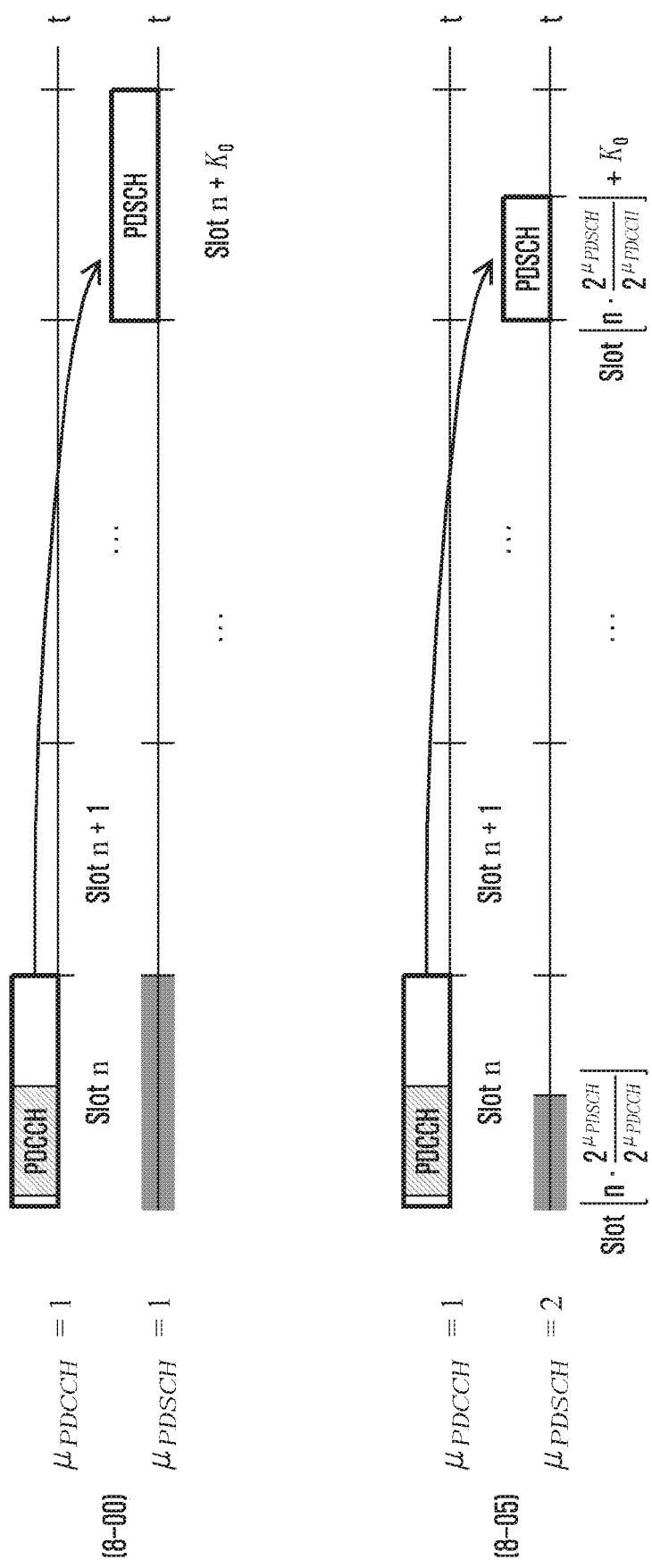
FIG. 8 is a diagram illustrating an example of time domain resource allocation according to subcarrier spacing of a data channel and a control channel in a wireless communication system according to an embodiment of the disclosure.

FIG. 8 is a diagram illustrating an example of time domain resource allocation according to subcarrier spacing of a data channel and a control channel in a wireless communication system according to an embodiment of the disclosure.

Referring to FIG. 8, if the subcarrier spacing of the data channel is the same as the subcarrier spacing of the control channel ($\mu_{PDSCH}=\mu_{PDCCH}$) (8-00), the slot numbers for the data and the control are the same. Accordingly, the base station and the terminal may recognize the occurrence of scheduling offset according to a predetermined slot offset ($K_0$).

On the other hand, if the subcarrier spacing of the data channel is different from the subcarrier spacing of the control channel ($\mu_{PDSCH}\neq\mu_{PDCCH}$) (8-05), the slot numbers for the data and the control are different from each other. Accordingly, the base station and the terminal may recognize the occurrence of scheduling offset according to a predetermined slot offset ($K_0$), based on the subcarrier spacing of the PDCCH.

NR provides various types of DCI formats as shown in Table 6 below in order for the terminal to efficiently receive a control channel.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 in order to schedule PDSCHs for a single cell.

DCI format 0_1 includes at least the following information in the case where DCI format 0_1 is transmitted together with CRC scrambled by a cell radio network temporary identifier (C-RNTI), a configured scheduling RNTI (CS-RNTI), or a new-RNTI.

Identifier for DCI formats (1 bits): This is a DCI format indicator, which is always configured as "1".

Frequency domain resource assignment ($N_{RBG}$ bits or $\lceil \log_2(N_{RB}^{DL,BWP} (N_{RB}^{DL,BWP}+1)/2) \rceil$ bits): This indicates frequency domain resource allocation, and if DCI format 1_0 is monitored in the UE specific search space, $N_{RB}^{DL,BWP}$ indicates the size of an active DL BWP. Otherwise, $N_{RB}^{DL,BWP}$ indicates the size of an initial DL BWP. The $N_{RBG}$ is the number of resource block groups. Refer to the above frequency domain resource allocation for details thereof.

Time domain resource assignment (0 to 4 bits): This indicates time domain resource allocation according to the above description.

VRB-to-PRB mapping (1 bit): "0" indicates non-interleaved VRB-to-PRB mapping, and "1" indicates interleaved VRP-to-PRB mapping.

Modulation and coding scheme (5 bits): This indicates a modulation order and a coding rate used in transmission of a PDSCH.

New data indicator (1 bit): This indicates whether the PDSCH corresponds to initial transmission or retransmission according to toggling.

Redundancy version (2 bits): This indicates the redundancy version used for the transmission of a PDSCH.

HARQ process number (4 bits): This indicates an HARQ process number used in transmission of a PDSCH.

Downlink assignment index (2 bits): This is a DAI indicator.

TPC command for scheduled PUCCH (2 bits): This is a PUCCH power control indicator PUCCH resource indicator (3 bits): This is a PUCCH resource indicator and indicates one of eight resources configured using a higher layer.

PDSCH-to-HARQ_feedback timing indicator (3 bits): This is a HARQ feedback timing indicator and indicates one of eight feedback timing offsets configure using a higher layer.

DCI format 1_1 includes at least the following information in the case where DCI format 1_1 is transmitted together with CRC scrambled by a cell radio network temporary identifier (C-RNTI), a configured scheduling RNTI (CS-RNTI) or a new-RNTI.

Identifier for DCI formats (1 bit): This is a DCI format indicator, which is always configured as "1".

Carrier indicator (0 or 3 bits): This indicates a CC (or a cell) in which the PDSCH allocated by a corresponding DCI is transmitted.

Bandwidth part indicator (0, 1, or 2 bits): This indicates the BWP through which the PDSCH allocated by a corresponding DCI is transmitted.

Frequency domain resource assignment (a payload is determined according to the frequency domain resource allocation): This indicates frequency domain resource allocation, and $N_{RB}^{DL,BWP}$ indicates the size of an active DL BWP. Refer to the frequency domain resource allocation for details thereof.

Time domain resource assignment (0 to 4 bits): This indicates time domain resource allocation according to the above description.

VRB-to-PRB mapping (0 or 1 bit): "0" indicates non-interleaved VRB-to-PRB mapping, and "1" indicates interleaved VRP-to-PRB mapping. This is 0 bit in the case where the frequency domain resource allocation is configured as resource type 0.

PRB bundling size indicator (0 or 1 bit): This is 0 bit if a higher layer parameter "prb-BundlingType" is not configured or is configured as "static", and is 1 bit if a higher layer parameter "prb-BundlingType" is configured as "dynamic".

Rate matching indicator (0 or 1 or 2 bits): This indicates a rate matching pattern.

ZP CSI-RS trigger (0 or 1 or 2 bits): This is an indicator for triggering an aperiodic ZP CSI-RS.

For transport block 1:

Modulation and coding scheme (5 bits): This indicates a modulation order and a coding rate used for the transmission of a PDSCH.

New data indicator (1 bit): This indicates whether the PDSCH corresponds to initial transmission or retransmission according to toggling.

Redundancy version (2 bits): This indicates the redundancy version used in transmission of a PDSCH.

For transport block 2:

Modulation and coding scheme (5 bits): This indicates a modulation order and a coding rate used for the transmission of a PDSCH.

New data indicator (1 bit): This indicates whether the PDSCH corresponds to initial transmission or retransmission according to toggling.

Redundancy version (2 bits): This indicates the redundancy version used in transmission of a PDSCH.

HARQ process number (4 bits): This indicates an HARQ process number used in transmission of a PDSCH.

Downlink assignment index (0, 2, or 4 bits): This is a DAI indicator.

TPC command for scheduled PUCCH (2 bits): This is a PUCCH power control indicator PUCCH resource indicator (3 bits): This is a PUCCH resource indicator and indicates one of eight resources configured using a higher layer.

PDSCH-to-HARQ_feedback timing indicator (3 bits): This is a HARQ feedback timing indicator and indicates one of eight feedback timing offsets configured using a higher layer.

Antenna port (4, 5, or 6 bits): This indicates a DMRS port and a code-division-multiplexed (CDM) group without data.

Transmission configuration indication (0 or 3 bits): a TCI indicator.

SRS request (2 or 3 bits): an SRS transfer request indicator

CBG transmission information (0, 2, 4, 6, or 8 bits): This is an indicator indicating whether or not to transmit code block groups in the allocated PDSCH. "0" indicates that a corresponding CBG is not to be transmitted, and "1" indicates that a corresponding CBG is to be transmitted.

CBG flushing out information (0 or 1 bit): This is an indicator indicating whether or not previous CBGs are contaminated. "0" indicates that the previous CBGs might be contaminated, and "1" indicates that the previous CBGs are combinable when receiving a retransmission.

DMRS sequence initialization (0 or 1 bit): a DMRS scrambling ID selection indicator The number of DCIs having different sizes that the terminal is capable of receiving for each slot in a corresponding cell is up to 4. The number of DCIs having different sizes, which are scrambled with a C-RNTI that can be received by the terminal for each slot in a corresponding cell, is up to 3. Here, the antenna port indication may be indicated through the following Tables 7 to 10.

TABLE 7

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| One codeword: Codeword 0 enabled, Codeword 1 disabled | | Two codewords: Codeword 0 enabled, Codeword 1 enabled | | | One codeword: Codeword 0 enabled, Codeword 1 disabled | | Two codewords: Codeword 0 enabled, Codeword 1 enabled | | |
|---|---|---|---|---|---|---|---|---|---|
| Value | Number of DMRS CDM groups(s) without data | DMRS port(s) | Value | Number of DMRS CDM group(s) without data | DMRS port(s) | Value | Number of DMRS CDM groups(s) without data | DMRS port(s) | Value | Number of DMRS CDM group(s) without data | DMRS port(s) |
| 0 | 1 | 0 | 0 | 3 | 0-4 | 13 | 3 | 2 | | | |
| 1 | 1 | 1 | 1 | 3 | 0-5 | 14 | 3 | 3 | | | |
| 2 | 1 | 0, 1 | 2-31 | reserved | reserved | 15 | 3 | 4 | | | |
| 3 | 2 | 0 | | | | 16 | 3 | 5 | | | |
| 4 | 2 | 1 | | | | 17 | 3 | 0, 1 | | | |
| 5 | 2 | 2 | | | | 18 | 3 | 2, 3 | | | |
| 6 | 2 | 3 | | | | 19 | 3 | 4, 5 | | | |
| 7 | 2 | 0, 1 | | | | 20 | 3 | 0-2 | | | |
| 8 | 2 | 2, 3 | | | | 21 | 3 | 3-5 | | | |
| 9 | 2 | 0-2 | | | | 22 | 3 | 0-3 | | | |
| 10 | 2 | 0-3 | | | | 23 | 2 | 0, 2 | | | |
| 11 | 3 | 0 | | | | 24-31 | Reserved | Reserved | | | |
| 12 | 3 | 1 | | | | | | | | | |

TABLE 10

Antenna port(s) (1000 + DMRS port), dmrs-Type = 2, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |

TABLE 10-continued

Antenna port(s) (1000 + DMRS port), dmrs-Type = 2, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Table 7 is used when "dmrs-type" is indicated as 1 and "maxLength" is indicated as 1, and Table 8 is used when "dmrs-type"=1 and "maxLength"=2. In addition, the port of the DMRS to be used is indicated using Table 9 when "dmrs-type"=2 and "maxLength"=1, and Table 10 when "dmrs-type"=2 and "maxLength"=2. The numbers 1, 2, and 3 indicated by "Number of DMRS CDM group(s) without data" in the tables denote CDMR groups {0}, {0, 1}, and {0, 1, 2}, respectively. "DMRS port(s)" show indexes of the used ports arranged in sequence. The antenna port is indicated as "DMRS port+1000". The CDM group of the DMRS is associated with a method of generating a DMRS sequence and the antenna ports as shown in Tables 11 and 12. Table 11 shows parameters when "dmrs-type"=1, and Table 12 shows parameters when "dmrs-type"=2.

TABLE 11

Parameters for PDSCH DM-RS dmrs-type = 1

| | CDM group | | | $w_f(k')$ | | $w_t(l')$ | |
|---|---|---|---|---|---|---|---|
| p | λ | Δ | k' = 0 | k' = 1 | l' = 0 | l' = 1 | |
| 1000 | 0 | 0 | +1 | +1 | +1 | +1 | |
| 1001 | 0 | 0 | +1 | −1 | +1 | +1 | |
| 1002 | 1 | 1 | +1 | +1 | +1 | +1 | |
| 1003 | 1 | 1 | +1 | −1 | +1 | +1 | |
| 1004 | 0 | 0 | +1 | +1 | +1 | −1 | |
| 1005 | 0 | 0 | +1 | −1 | +1 | −1 | |
| 1006 | 1 | 1 | +1 | +1 | +1 | −1 | |
| 1007 | 1 | 1 | +1 | −1 | +1 | −1 | |

TABLE 12

Parameters for PDSCH DM-RS dmrs-type = 2

| | CDM group | | | $w_f(k')$ | | $w_t(l')$ | |
|---|---|---|---|---|---|---|---|
| p | λ | Δ | k' = 0 | k' = 1 | l' = 0 | l' = 1 | |
| 1000 | 0 | 0 | +1 | +1 | +1 | +1 | |
| 1001 | 0 | 0 | +1 | −1 | +1 | +1 | |
| 1002 | 1 | 2 | +1 | +1 | +1 | +1 | |
| 1003 | 1 | 2 | +1 | −1 | +1 | +1 | |
| 1004 | 2 | 4 | +1 | +1 | +1 | +1 | |
| 1005 | 2 | 4 | +1 | −1 | +1 | +1 | |
| 1006 | 0 | 0 | +1 | +1 | +1 | −1 | |
| 1007 | 0 | 0 | +1 | −1 | +1 | −1 | |
| 1008 | 1 | 2 | +1 | +1 | +1 | −1 | |
| 1009 | 1 | 2 | +1 | −1 | +1 | −1 | |
| 1010 | 2 | 4 | +1 | +1 | +1 | −1 | |
| 1011 | 2 | 4 | +1 | −1 | +1 | −1 | |

The sequence of DMRSs according to respective parameters is determined using Equation 1 below.

$$a_{k,i}^{(p,\mu)} = \beta_{PDSCH}^{DMRS} w_f(k') w_t(l') r(2n + k') \quad \text{Equation 1}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

If only one codeword is enabled in Table 7 and Table 8, the lines 2, 9, 10, 11, and 30 are used only for single-user MIMO. That is, in this case, the terminal may not perform a multi-user MIMO reception operation, such as canceling, nulling, or whitening the multi-user interference, without assuming that another terminal is co-scheduled.

If only one codeword is enabled in Table 9 and Table 10, the lines 2, 10, and 23 are used only for single-user MIMO. That is, in this case, the terminal may not perform a multi-user MIMO reception operation, such as canceling, nulling, or whitening the multi-user interference, without assuming that another terminal is co-scheduled.

Figure 9:
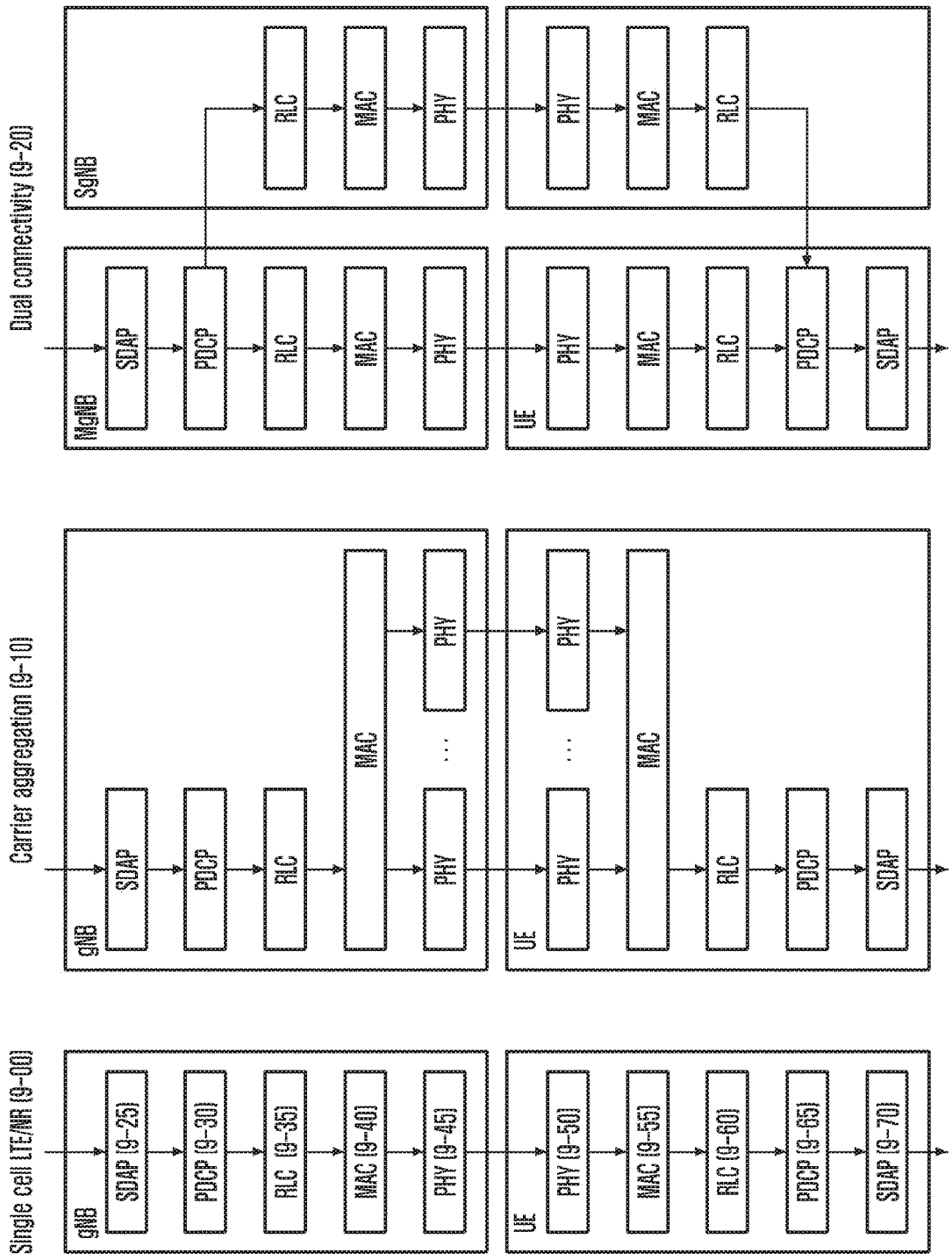
FIG. 9 is a diagram illustrating protocol stacks of a base station and a terminal in the case of a single cell, carrier aggregation, and dual connectivity (DC) in a wireless communication system according to an embodiment of the disclosure.

FIG. 9 is a diagram illustrating the radio protocol structure of a base station and a terminal in the case of a single cell, carrier aggregation, and dual connectivity, respectively, according to an embodiment of the disclosure.

Referring to FIG. 9, the radio protocol of the next-generation mobile communication system includes NR service data adaption protocol (SDAP) 9-25 or 9-70, NR packet data convergence protocol (PDCP) 9-30 or 9-65, NR radio link control (RLC) 9-35 or 9-60, and NR medium access control (MAC) 9-40 or 9-55 in a terminal and an NR base station, respectively.

The primary functions of the NR SDAP 9-25 or 9-70 may include some of the following functions.
   Transfer of user plane data
   Mapping between QoS flow and DRB for DL and UL
   Marking QoS flow ID in both DL and UL packets
   Mapping reflective QoS flow to DRB for UL SDAP PDUs
   With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 9-30 or 9-65 may include some of the following functions.
   Header compression and decompression (ROHC only)
   Transfer of user data
   In-sequence delivery of upper layer PDUs
   Out-of-sequence delivery of upper layer PDUs
   Sequence reordering (PDCP PDU reordering for reception)
   Duplicate detection of lower layer SDUs
   Retransmission of PDCP SDUs
   Ciphering and deciphering
   Timer-based SDU discard in uplink The above reordering function of the NR PDCP entity denotes a function of reordering PDCP PDUs received from a lower layer, based on a PDCP sequence number (SN), may include a function of transmitting data to a higher layer in the reordered order, may include a function of directly transmitting data without consideration of an order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 9-35 or 9-60 may include some of the following functions.
   Data transfer function (transfer of upper layer PDUs)
   In-sequence delivery of upper layer PDUs
   Out-of-sequence delivery of upper layer PDUs
   ARQ function (error correction through ARQ)
   Concatenation, segmentation, and reassembly of RLC SDUs
   Re-segmentation of RLC data PDUs
   Reordering of RLC data PDUs
   Duplicate detection
   Protocol error detection
   RLC SDU discard
   RLC re-establishment The above in-sequence delivery function of the NR RLC entity denotes a function of transferring RLC SDUs received from a lower layer to a higher layer in sequence, may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to a higher layer in sequence, may include a function of, if a predetermined timer expires even though there is a lost RLC SDU, transmitting all RLC SDUs received before the timer starts to a higher layer in sequence, or may include a function of, if a predetermined timer expires even though there is a lost RLC SDU, transmitting all RLC SDUs received until the present to a higher layer in sequence. In addition, the RLC PDUs may be processed in the order of reception (in the order of arrival regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity denotes a function of directly transmitting RLC SDUs received from a lower layer to a higher layer regardless of sequence, may include a function of, if one original RLC SDU is divided into a plurality of RLC SDUs and is received, reassembling and transmitting the same, and may include a function of storing and ordering RLC SNs or PDCP SNs of the received RLC PDUs, thereby recording the lost RLC PDUs.

The NR MAC 9-40 or 9-55 may be connected to a plurality of NR RLC entities configured in a single terminal, and the primary functions of the NR MAC may include some of the following functions.
   Mapping between logical channels and transport channels
   Multiplexing/demultiplexing of MAC SDUs
   Scheduling information reporting
   HARQ function (error correction through HARQ)
   Priority handling between logical channels of one UE
   Priority handling between UEs by means of dynamic scheduling
   MBMS service identification
   Transport format selection
   Padding The NR PHY layers 9-45 and 9-50 may perform operations of channel-coding and modulating the higher layer data into OFDM symbols and transmitting the same through a radio channel, or operations of demodulating and channel-decoding the OFDM symbols received through the radio channel and transmitting the same to the higher layer.

The detailed structures of the radio protocols may be changed in various ways according to a carrier (or cell) operating scheme. For example, in the case where a base station transmits data to a terminal, based on a single carrier (or cell), the base station and the terminal use a single protocol structure for the respective layers as shown in 9-00.

On the other hand, in the case where a base station transmits data to a terminal, based on carrier aggregation (CA) using multiple carriers in a single TRP, the base station and the terminal use a protocol structure in which a single structure is provided until the RLC layer and the PHY layer is multiplexed through the MAC layer as shown in 9-10.

As another example, in the case where a base station transmits data to a terminal, based on dual connectivity (DC) using multiple carriers in multiple TRPs, the base station and the terminal use a protocol structure in which a single structure is provided until the RLC layer and the PHY layer is multiplexed through the MAC layer as shown in 9-20.

In LTE and NR, the terminal has a procedure of reporting capability supported by the terminal to a corresponding base station while being connected to a serving base station, which will be referred to as "UE capability (reporting)" in the following description.

The base station may transmit a UE capability enquiry message requesting capability reporting to a terminal in a connected state. The message may include a request for terminal capability for each RAT type by the base station. The request for each RAT type may include information on a requested frequency band. In addition, the UE capability enquiry message may be transmitted while requesting a plurality of RAT types through a single RRC message container, or a plurality of UE capability enquiry messages including requests for respective RAT types may be included to then be transmitted to the terminal. That is, the UE capability enquiry may be repeated multiple times, and the terminal may configure a UE capability information message corresponding thereto, and may report the same multiple times. In the next-generation mobile communication system, a request for terminal capability may be performed for MR-DC, as well as NR, LTE, and EN-DC. For reference, the UE capability enquiry message is generally transmitted in the initial stage after the terminal is connected, but the base station is capable of requesting the UE capability under any condition as necessary.

In the above step, the terminal receiving the request for reporting the UE capability from the base station configures terminal capability according to the RAT type requested by the base station and band information. A method of configuring UE capability by the terminal in an NR system will be summarized below.

1. If the terminal receives a list of LTE and/or NR bands through a UE capability request from the base station, the terminal configures a band combination (BC) for EN-DC and NR stand-alone (SA). In other words, the terminal configures a candidate list of BCs for EN-DC and NR SA, based on the bands requested by the base station using "FreqBandList". In addition, the bands have priority in the order as described in "FreqBandList".

2. If the base station requests UE capability reporting by setting "eutra-nr-only" flag or "eutra" flag, the terminal completely removes the NR SA BCs from the configured candidate list of BCs. This operation may be performed only when an LTE base station (eNB) requests "eutra" capability.

3. Thereafter, the terminal removes fallback BCs from the candidate list of BCs configured in the above step. The fallback BC corresponds to the case in which the band corresponding to at least one SCell is removed from certain super set BCs, and the fallback BC may be omitted because the super configure BCs are capable of covering the fallback BC. This step is also applied to the MR-DC, i.e., LTE bands. The remaining BCs after this step constitute a final "candidate BC list".

4. The terminal selects the BCs to be reported, which conform to the requested RAT type, from the final "candidate BC list". In this step, the terminal configures "supportedBandCombinationList" in a predetermined order. In other words, the terminal configures the BCs and UE capability to be reported in the order of the preconfigured RAT types (nr→eutra-nr→eutra). In addition, the terminal configures "feature SetCombination" for the configured "supportedBandCombinationList" and configures a list of "candidate feature set combinations" from the candidate BC list from which the list of the fallback BCs (including capabilities in the equal or lower level) is removed. The "candidate feature set combination" may include the feature set combinations for BCs both of NR and EUTRA-NR, and may be obtained from the feature set combinations of the "UE-NR-Capabilities" and "UE-MRDC-Capabilities" containers.

5. In addition, if the requested RAT type is "eutra-nr" and has affects, "featureSetCombinations" is included in both containers of "UE-MRDC-Capabilities" and "UE-NR-Capabilities". However, the feature set of NR is included only in "UE-NR-Capabilities".

After the terminal capability is configured, the terminal may transmit a UE capability information message including the UE capability to the base station. Then, the base station performs an appropriate scheduling and transmission/reception management for the terminal, based on the UE capability received from the terminal.

For the convenience of description below, Tables 7 to 10 will be referred to as "first antenna port indication (or antenna port indication of the related art)", and the tables obtained by modifying some or all of the code points in Tables 7 to 10 will be referred to as "second antenna port indication (new antenna port indication)".

In order to support non-coherent joint transmission (NC-JT) for providing data to a terminal at one or more transmission points at the same time, it is necessary to 1) allocate the PDSCHs transmitted at two (or more) different transmission points through a single PDCCH or 2) allocate the PDSCHs transmitted at two or more different transmission points through multiple PDCCHs. The terminal is capable of acquiring a QCL connection relationship between respective reference signals or between channels, based on L1/L2/L3 signaling and efficiently estimating the large-scale parameters of each reference signal or channel according thereto. If the transmission point of a certain reference signal or channel is different, it is difficult for the large-scale parameters to be shared with each other. Therefore, the base station needs to simultaneously inform the terminal of quasi co-location information about two or more transmission points through two or more TCI states when performing cooperative transmission. If the non-coherent cooperative transmission is supported through multiple PDCCHs, that is, if two or more PDCCHs allocate two or more PDSCHs to the same serving cell and the same bandwidth part at the same time, the two or more TCI states may be allocated to the respective PDSCHs or DMRS ports through the respective PDCCHs. On the other hand, if the non-coherent cooperative transmission is supported through a single PDCCH, that is, if one PDCCH allocates two or more PDSCHs to the same serving cell and the same bandwidth part at the same time, the two or more TCI states must be allocated to the respective PDSCHs or DMRS ports through a single PDCCH.

If it is assumed that the DMRS ports allocated to the terminal are divided into DMRS port group A transmitted at transmission point A and DMRS port group B transmitted at transmission point B at a specific time, the two or more TCI states may be connected to the respective DMRS port groups to estimate channels, based on different QCL assumptions for the respective groups. Meanwhile, different DMRS ports may be code-division-multiplexed (CDM), frequency-division-multiplexed (FDM), or time-domain-multiplexed (TDM) in order to increase the channel measurement accuracy and reduce transmission burden. If the DMRS ports to be multiplexed using CDM, among the above DMRS ports, are collectively referred to as a "CDM group", it may be important to ensure that the DMRS ports existing in the same CDM group do not have different TCI states because when the DMRS ports in the CDM group have similar characteristics of channels for the respective ports, the code-based multiplexing is performed well (that is, in the case where the characteristics of channels for the respective ports are similar, distinction using orthogonal cover code (OCC) is easily performed). The disclosure provides a method of indicating, to a terminal, DMRS ports and a CDM group without data in order to satisfy the characteristics described above.

Hereinafter, for the convenience of explanation, the allocation of the DMRS ports and the CDM group without data will be referred to as "DMRS allocation".

Referring to the first antenna port indication as shown in Tables 7 to 10 (hereinafter, referred to as "antenna port indication of the related art"), it can be seen that some of the code points that are able to be used for the NC-JT, that is, the points for allocating two or more DMRSs, do not satisfy a DMRS allocation condition for the NC-JT (i.e., a condition in which the DMRS ports existing in the same CDM group do not have different TCI states from each other). For example, in the case where a single codeword is used in Table 9, it can be seen that lines {2, 7, 8, 17, 18, 19}, which are some of lines {2, 7, 8, 9, 10, 17, 18, 19, 20, 21, 22, 23} that allocate two or more DMRS ports, allocate one of the DMRS port pairs {0, 1}, {2, 3}, and {4, 5}, and that the DMRS port pairs belong to a single CDM group according to Table 12. This means that lines {2, 7, 8, 17, 18, 19} are not suitable for DMRS allocation for the NC-JT in Table 9. This makes it impossible to use about half of the possible code points, and the antenna port indications of the related art are required to be changed.

In the above description, "allocating" DMRS ports and CDM groups for the NC-JT may be understood as allocation of the DMRS ports and the CDM groups at the time at which the terminal recognizes that two or more PDSCHs are able to be allocated to the same serving cell and the same bandwidth part using one PDCCH (or two or more DMRS port groups or allocated TCI code points are associated with two or more TCI states) by various methods such as a size of DCI, a payload of a specific field in DCI, and the type of RNTI used for the CRC scrambling of the PDCCH including the DCI.

Similar to the above description, in the case where a single codeword is used in Table 7, it can be seen that lines {2, 7, 8}, which are some of lines {2, 7, 8, 9, 10, 11} that allocate two or more DMRS ports, allocate one of the DMRS port pairs {0, 1} and {2, 3}, and that the DMRS port pairs belong to a single CDM group according to Table 11. This means that lines {2, 7, 8} are not suitable for DMRS allocation for the NC-JT in Table 9.

Similar to the above description, in the case where a single codeword is used in Table 8, it can be seen that lines {2, 7, 8, 20, 21, 22, 23, 24, 25, 26, 27, 28, 29}, which are some of lines {2, 7, 8, 9, 10, 11, 20, 21, 22, 23, 24, 25, 26, 27, 28, 29, 30} that allocate two or more DMRS ports, allocate one of the DMRS port pairs {0, 1}, {2, 3}, {0, 4}, {2, 6}, {0, 1, 4}, {2, 3, 6}, {0, 1, 4, 5}, and {2, 3, 6, 7}, and that the DMRS port pairs belong to a single CDM group according to Table 11. This means that lines {2, 7, 8, 20, 21, 22, 23, 24, 25, 26, 27, 28, 29} are not suitable for DMRS allocation for the NC-JT in Table 9.

Similar to the above description, in the case where a single codeword is used in Table 10, it can be seen that lines {2, 7, 8, 17 to 19, 36 to 47, 52}, which are some of lines {2, 7, 8, 9, 10, 17 to 23, 36 to 47, 52} that allocate two or more DMRS ports, allocate one subset of the DMRS port pairs {0, 1, 6, 7}, {2, 3, 8, 9}, and {4, 5, 10, 11}, and that the DMRS port pairs belong to a single CDM group according to Table 12. This means that lines {2, 7, 8, 17 to 19, 36 to 47, 52} are not suitable for DMRS allocation for the NC-JT in Table 10.

The following embodiments provide a method of performing second antenna port indication (hereinafter, referred to as "new antenna port indication") by modifying some or all of the code points of the antenna port indication of the related art and a method of selecting one of the antenna port indication of the related art and the new antenna port indication, based on the above method.

First Embodiment: New Antenna Port Indication Method 1

A first embodiment proposes a method of performing new antenna port indication by correcting the code points having the problems as described above in the antenna port indication of the related art.

As one of the methods for solving the problems described above, it is possible to divide the DMRS ports indicated under specific conditions into two or more groups, and to modify the values of the DMRS ports belonging to a second group through a specific operation.

The above specific conditions may be at least one of 1) that the number of DMRS CDM groups indicated by the antenna port indication is 2 or more, 2) that the number of DMRS ports indicated by the antenna port indication is 2 or more, and 3) that the number of codewords indicated by the antenna port indication is 2 or more, or may be a combination thereof (for example, the case where both condition 1 and condition 2 are satisfied).

Dividing the DMRS ports into two or more groups may be, for example, dividing the DMRS ports into two or more groups having an equal number of DMRS ports in descending or ascending order, based on DMRS port numbers assigned to the respective DMRS ports (in the case where the DMRS ports are unable to be divided into an equal number of DMRS ports, the DMRS ports may be divided such that the last group has a smaller number of DMRS ports or such that any group has a smaller number of DMRS ports).

The specific operation may be adding or subtracting a specific value X (e.g., X=1 or 2), which is predetermined or configured through higher layer signaling. Alternatively, the specific operation may be taking a modulo operation such that the value obtained by adding the value X does not exceed a specific range (e.g., the maximum DMRS port number that is able to be indicated by the corresponding antenna port indication).

A method of changing the second half of the DMRS port set indicated by the problematic code points, among the antenna port indication code points of the related art, using a rule "(second half of DMRS port set+2) % Max DMRS port" may be considered as a method of performing configuration such that the DMRS ports associated with different TCI states are transmitted in different CDM groups. This may be expressed in detail as shown in Table 13-1 to Table 13-4 below.

For example, referring to Table 13-1, if existing DMRS ports are 0 and 1, DMRS port 1 corresponding to the second half may be changed to (1+2) % 4=3.

For example, referring to Table 13-2, if existing DMRS ports are 0, 1, 4, and 5, DMRS ports 4 and 5 corresponding to the second half may be changed to 6 and 7 by applying the same equation.

The same principle is applied to Tables 13-3 and 13-4, and if three DMRS ports are used, the first half indicates the first two DMRS ports, and the second half indicates the third DMRS port. The port indexes after change may be used while being sorted in the order of a small index or without sorting the same. A method of indicating the changed code points may include a method of pre-storing the changed code points in a memory of the terminal and then using the same, a method of updating values for the respective code points through RRC, and a method of indicating a change rule, which is actually used, among one or more change rules using RRC.

TABLE 13-1

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| <u>7</u> | <u>2</u> | <u>0, 3</u> |
| <u>8</u> | <u>2</u> | <u>2, 1</u> |
| 9 | 2 | 0-2 |
| 10 | 2 | 0-3 |
| 11 | 2 | 0, 2 |
| 12-15 | Reserved | Reserved |

TABLE 13-2

DMRS indication table for antenna port(s) (1000 + DMRS port), dmrs-Type = 1, maxLength = 2

| | One Codeword:<br>Codeword 0 enabled, Codeword 1 disabled | | | | Two Codewords:<br>Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| <u>7</u> | <u>2</u> | <u>0, 3</u> | <u>1</u> | | | | |
| <u>8</u> | <u>2</u> | <u>2, 5</u> | <u>1</u> | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| <u>20</u> | <u>2</u> | <u>0, 3</u> | <u>2</u> | | | | |
| <u>21</u> | <u>2</u> | <u>2, 5</u> | <u>2</u> | | | | |
| <u>22</u> | <u>2</u> | <u>4, 7</u> | <u>2</u> | | | | |
| <u>23</u> | <u>2</u> | <u>6, 9</u> | <u>2</u> | | | | |
| <u>24</u> | <u>2</u> | <u>0, 6</u> | <u>2</u> | | | | |
| <u>25</u> | <u>2</u> | <u>2, 0</u> | <u>2</u> | | | | |
| <u>26</u> | <u>2</u> | <u>0, 1, 6</u> | <u>2</u> | | | | |
| <u>27</u> | <u>2</u> | <u>2, 3, 0</u> | <u>2</u> | | | | |
| <u>28</u> | <u>2</u> | <u>0, 1, 6, 7</u> | <u>2</u> | | | | |
| <u>29</u> | <u>2</u> | <u>2, 3, 0, 1</u> | <u>2</u> | | | | |
| 30 | 2 | 0, 2, 4, 6 | 2 | | | | |
| 31 | Reserved | Reserved | Reserved | | | | |

TABLE 13-3

DMRS indication table for antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | | |
|---|---|---|---|---|---|---|
| Value | Number of DMRS CDM group(s) without data | DMRS port(s) | Value | Number of DMRS CDM group(s) without data | DMRS port(s) | |
| 0 | 1 | 0 | 0 | 3 | 0-4 | |
| 1 | 1 | 1 | 1 | 3 | 0-5 | |
| 2 | 1 | 0, 1 | 2-31 | reserved | reserved | |
| 3 | 2 | 0 | | | | |
| 4 | 2 | 1 | | | | |
| 5 | 2 | 2 | | | | |
| 6 | 2 | 3 | | | | |
| <u>7</u> | <u>2</u> | <u>0, 3</u> | | | | |
| <u>8</u> | <u>2</u> | <u>2, 5</u> | | | | |
| 9 | 2 | 0-2 | | | | |
| 10 | 2 | 0-3 | | | | |
| 11 | 3 | 0 | | | | |
| 12 | 3 | 1 | | | | |
| 13 | 3 | 2 | | | | |
| 14 | 3 | 3 | | | | |
| 15 | 3 | 4 | | | | |
| 16 | 3 | 5 | | | | |
| <u>17</u> | <u>3</u> | <u>0, 3</u> | | | | |
| <u>18</u> | <u>3</u> | <u>2, 5</u> | | | | |
| <u>19</u> | <u>3</u> | <u>4, 7</u> | | | | |
| 20 | 3 | 0-2 | | | | |
| 21 | 3 | 3-5 | | | | |
| 22 | 3 | 0-3 | | | | |
| 23 | 2 | 0, 2 | | | | |
| 24-31 | Reserved | Reserved | | | | |

TABLE 13-4

DMRS indication table for antenna port(s) (1000 + DMRS port), dmrs-Type = 2, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | <u>2</u> | <u>0, 3</u> | <u>1</u> | | | | |
| 8 | <u>2</u> | <u>2, 5</u> | <u>1</u> | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | <u>3</u> | <u>0, 3</u> | <u>1</u> | | | | |
| 18 | <u>3</u> | <u>2, 5</u> | <u>1</u> | | | | |
| 19 | <u>3</u> | <u>4, 7</u> | <u>1</u> | | | | |
| 20 | 3 | 0- | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 1 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |

TABLE 13-4-continued

DMRS indication table for antenna port(s) (1000 + DMRS port), dmrs-Type = 2, maxLength = 2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | _3_ | _0, 3_ | _2_ | | | | |
| 37 | _3_ | _2, 5_ | _2_ | | | | |
| 38 | _3_ | _4, 7_ | _2_ | | | | |
| 39 | _3_ | _6, 9_ | _2_ | | | | |
| 40 | _3_ | _8, 11_ | _2_ | | | | |
| 41 | _3_ | _10, 1_ | _2_ | | | | |
| 42 | _3_ | _0, 1, 8_ | _2_ | | | | |
| 43 | _3_ | _2, 3, 10_ | _2_ | | | | |
| 44 | _3_ | _4, 5, 0_ | _2_ | | | | |
| 45 | _3_ | _0, 1, 8, 9_ | _2_ | | | | |
| 46 | _3_ | _2, 3, 10, 11_ | _2_ | | | | |
| 47 | _3_ | _4, 5, 0, 1_ | _2_ | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

A method of changing the second half of the DMRS port set indicated by the problematic code points, among the antenna port indication code points of the related art, using a rule of "second half of DMRS port set+2" and, if the value is negative, adding the Max DMRS port, may be considered as another method of performing configuration such that the DMRS ports associated with different TCI states are transmitted in different CDM groups. This may be expressed in detail as shown in Table 14-1 to Table 14-4 below.

For example, if existing DMRS ports are 0 and 1 in Table 14-1, DMRS port 1 corresponding to the second half may be changed to (1−2)=−1, and since the value is negative, it may be changed to −1+4=3.

For example, in Table 14-2, if existing DMRS ports are 0, 2, 6, and 7 at existing code point 29, DMRS ports 6 and 7 corresponding to the second half may be changed to 4 and 5 by applying the same equation.

The same principle is applied to Tables 14-3 and 14-4, and if three DMRS ports are used, the first half indicates the first two DMRS ports, and the second half indicates the third DMRS port. The port indexes according to the change may be used while being sorted in the order of a small index or without sorting the same. A method of indicating the changed code points may include a method of pre-storing the changed code points in a memory of the terminal and then using the same, a method of updating values for the respective code points through RRC, and a method of indicating a change rule, which is actually used, among one or more change rules using RRC.

TABLE 14-1

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| _7_ | _2_ | _0, 3_ |
| _8_ | _2_ | _2, 1_ |
| 9 | 2 | 0-2 |
| 10 | 2 | 0-3 |
| 11 | 2 | 0, 2 |
| 12-15 | Reserved | Reserved |

TABLE 14-2

DMRS indication table for antenna port(s)
(1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| <u>7</u> | <u>2</u> | <u>0, 7</u> | <u>1</u> | | | | |
| <u>8</u> | <u>2</u> | <u>2, 1</u> | <u>1</u> | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| <u>20</u> | <u>2</u> | <u>0, 7</u> | <u>2</u> | | | | |
| <u>21</u> | <u>2</u> | <u>2, 1</u> | <u>2</u> | | | | |
| <u>22</u> | <u>2</u> | <u>4, 3</u> | <u>2</u> | | | | |
| <u>23</u> | <u>2</u> | <u>6, 5</u> | <u>2</u> | | | | |
| <u>24</u> | <u>2</u> | <u>0, 2</u> | <u>2</u> | | | | |
| <u>25</u> | <u>2</u> | <u>2, 4</u> | <u>2</u> | | | | |
| <u>26</u> | <u>2</u> | <u>0, 1, 2</u> | <u>2</u> | | | | |
| <u>27</u> | <u>2</u> | <u>2, 3, 4</u> | <u>2</u> | | | | |
| <u>28</u> | <u>2</u> | <u>0, 1, 2, 3</u> | <u>2</u> | | | | |
| <u>29</u> | <u>2</u> | <u>2, 3, 4, 5</u> | <u>2</u> | | | | |
| 30 | 2 | 0, 2, 4, 6 | 2 | | | | |
| 31 | Reserved | Reserved | Reserved | | | | |

TABLE 14-3

DMRS indication table for antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| <u>7</u> | <u>2</u> | <u>0, 5</u> | | | |
| <u>8</u> | <u>2</u> | <u>2, 1</u> | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| <u>17</u> | <u>3</u> | <u>0, 5</u> | | | |
| <u>18</u> | <u>3</u> | <u>2, 1</u> | | | |
| <u>19</u> | <u>3</u> | <u>4, 3</u> | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 14-4

DMRS indication table for antenna port(s)
(1000 + DMRS port), dmrs-Type = 2, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 3 | 2 | 0 | 1 | 2 | 2 | 0, 1, 2, 3, 6 | 2 |
| 4 | 2 | 1 | 1 | 3 | 2 | 0, 1, 2, 3, 6, 8 | 2 |
| 5 | 2 | 2 | 1 | 4 | 2 | 0, 1, 2, 3, 6, 7, 8 | 2 |
| 6 | 2 | 3 | 1 | 5 | 2 | 0, 1, 2, 3, 6, 7, 8, 9 | 2 |
| _7_ | _2_ | _0, 11_ | _1_ | 6-63 | Reserved | Reserved | Reserved |
| _8_ | _2_ | _2, 1_ | _1_ | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| _17_ | _3_ | _0, 11_ | _1_ | | | | |
| _18_ | _3_ | _2, 1_ | _1_ | | | | |
| _19_ | _3_ | _4, 3_ | _1_ | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| _36_ | _3_ | _0, 11_ | _2_ | | | | |
| _37_ | _3_ | _2, 1_ | _2_ | | | | |
| _38_ | _3_ | _4, 3_ | _2_ | | | | |
| _39_ | _3_ | _6, 5_ | _2_ | | | | |
| _40_ | _3_ | _8, 7_ | _2_ | | | | |
| _41_ | _3_ | _10, 9_ | _2_ | | | | |
| _42_ | _3_ | _0, 1, 4_ | _2_ | | | | |
| _43_ | _3_ | _2, 3, 6_ | _2_ | | | | |
| _44_ | _3_ | _4, 5, 8_ | _2_ | | | | |
| _45_ | _3_ | _0, 1, 4, 5_ | _2_ | | | | |
| _46_ | _3_ | _2, 3, 6, 7_ | _2_ | | | | |
| _47_ | _3_ | _4, 5, 8, 9_ | _2_ | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Second Embodiment: New Antenna Port Indication Method 2

The second embodiment proposes a method of further supporting the antenna port indication for NC-JT transmission while maintaining the code point indicated by the antenna port indication of the related art in order to maintain compatibility with the terminal in a network of the related art. The antenna port indication of the related art does not support some of the DMRS port allocation for the NC-JT.

For example, the antenna port indication of the related art does not support the code points for allocating one DMRS port to CDM group 0 and allocating two DMRS ports to CDM group 1. 1) If two or more TCI states are indicated, 2) if reordering the indicated TCI states is not supported (for example, {TCI state A, TCI state B} is supported, but {TCI state B, TCI state A} is not supported), and 3) if a connection relationship between the TCI state and the CDM group is configured to be static/semi-static (for example, connection is performed as TCI state A→CDM group 0 and TCI state B→CDM group 1), allocating one DMRS port to TRP A corresponding to TCI state A and allocating two DMRS ports to TRP B corresponding to TCI state B are not supported.

As a first method for supporting the DMRS port allocation according to the above-described second embodiment, a code point indicated as a reserved one in the antenna port indication of the related art, which is not used previously, may be used as an additional code point for NC-JT. The port allocation indicated by the additional code point for NC-JT may be a combination of numbers of antenna ports for respective TRPs that are not supported by the antenna port indication of the related art. This may be expressed in detail as shown in Table 15-1 to Table 15-4-2 below.

For example, referring to Table 15-1, code point 12 previously indicated as a reserved one may switch to a code point that allocates one DMRS port to CDM group 0 and allocates two DMRS ports to CDM group 1. A similar principle may be used in Table 15-2.

TABLE 15-1

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3 |
| 13-15 | Reserved | Reserved |

TABLE 15-2

DMRS indication table for antenna port(s) (1000 + DMRS port), dmrs-Type = 1, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |

TABLE 15-2-continued

DMRS indication table for antenna port(s)
(1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 30 | 2 | 0, 2, 4, 6 | 2 | | | | |
| 31 | 2 | 0, 2, 3 | 1 | | | | |

Meanwhile, the following two cases are considered in Table 15-3-1 and Table 15-3-2.

1) Table 15-3-1: In the case where TRP A is connected to CDM group 0 and TRP B is connected to CDM groups 1 and 2, (a) a code point that allocates one DMRS port to TRP A and allocates two DMRS ports to TRP B and (b) a code point that allocates one DMRS port to TRP A and allocates three DMRS ports to TRP B are supported. Some of the code points may be omitted depending on the channel characteristics between the TRP-terminals or the like. For example, the average channel gains from the respective TRPs to a terminal may have similar characteristics, and thus the channel ranks from the respective TRPs to the terminal may be similar. In this case, the code point of (b), which has a relatively large difference in the number of DMRS ports between two TRPs, may be omitted.

2) Table 15-3-2: In the case where TRP A is connected to CDM groups 0 and 1, and TRP B is connected to CDM group 2, (a) a code point that allocates one DMRS port to TRP A and two DMRS ports to TRP B, (b) a code point that allocates two DMRS ports to TRP A and TRP B, respectively, and (c) a code point that allocates one DMRS port to TRP A and three DMRS ports to TRP B are all supported. Some of the code points may be omitted depending on the channel characteristics between the TRP-terminals or the like. For example, the average channel gains from the respective TRPs to a terminal may have similar characteristics, and thus the channel ranks from the respective TRPs to the terminal may be similar. In this case, the code point for (c), which has a relatively large difference in the number of DMRS ports between two TRPs, may be omitted.

Table 15-4-1 and Table 15-4-2 also use the principles similar to Table 15-3-1 and Table 15-3-2, respectively.

TABLE 15-3-1

DMRS indication table for antenna port(s)
(1000 + DMRS port), dmrs-Type = 2, maxLength = 1

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |

TABLE 15-3-1-continued

DMRS indication table for antenna port(s)
(1000 + DMRS port), dmrs-Type = 2, maxLength = 1

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 21 | 2 | 2, 3 | 2 | | | |
| 22 | 2 | 4, 5 | 2 | | | |
| 23 | 2 | 6, 7 | 2 | | | |
| 24 | 2 | 0, 4 | 2 | | | |
| 25 | 2 | 2, 6 | 2 | | | |
| 26 | 2 | 0, 1, 4 | 2 | | | |
| 27 | 2 | 2, 3, 6 | 2 | | | |
| 28 | 2 | 0, 1, 4, 5 | 2 | | | |
| 29 | 2 | 2, 3, 6, 7 | 2 | | | |
| 30 | 2 | 0, 2, 4, 6 | 2 | | | |
| 31 | 2 | 0, 2, 3 | 1 | | | |

TABLE 15-3-2

DMRS indication table for antenna port(s) (1000 + DMRS port), dmrs-Type = 2, maxLength = 1

| | One codeword: Codeword 0 enabled, Codeword 1 disabled | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0, 1, 4 | | | |
| 25 | 3 | 0, 1, 4 | | | |
| 26 | 2 | 0, 4, 5 | | | |
| 27 | 3 | 0, 4, 5 | | | |
| 28 | 2 | 0, 1, 4, 5 | | | |
| 29 | 3 | 0, 1, 4, 5 | | | |
| 30 | 3 | 0, 1, 2, 4 | | | |
| 31 | Reserved | Reserved | | | |

TABLE 15-4-1

DMRS indication table for antenna port(s)
(1000 + DMRS port), dmrs-Type = 2, maxLength = 2

| | One codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 2, 3 | 1 | | | | |
| 59 | 3 | 0, 2, 3 | 1 | | | | |
| 60 | 3 | 0, 2, 3, 4 | 1 | | | | |
| 61 | 2 | 0, 2, 3 | 2 | | | | |
| 62 | 3 | 0, 2, 3 | 2 | | | | |
| 63 | 3 | 0, 2, 3, 4 | 2 | | | | |

TABLE 15-4-2

DMRS indication table for antenna port(s)
(1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 1, 4 | 1 | | | | |
| 59 | 3 | 0, 1, 4 | 1 | | | | |
| 60 | 2 | 0, 4, 5 | 1 | | | | |
| 61 | 3 | 0, 4, 5 | 1 | | | | |
| 62 | 2 | 0, 1, 4, 5 | 1 | | | | |
| 63 | 3 | 0, 1, 4, 5 | 1 | | | | |

As a second method for supporting DMRS port allocation according to the above-described second embodiment, a base station may indicate the order of TCI states to be activated. For example, the base station may indicate {TCI state A, TCI state B} and {TCI state B, TCI state A} in order for a terminal to distinguish therebetween. To this end, two methods may be considered as will be described in FIGS. 15A and 15B.

Figure 15A:
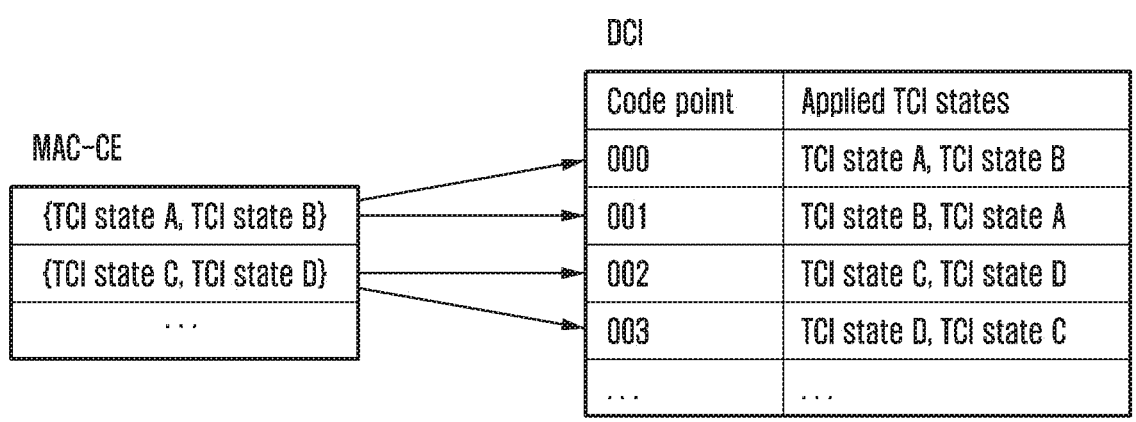
FIGS. 15A and 15B are diagrams illustrating a method for indicating the order between activated transmission configuration indication (TCI) states according to various embodiments of the disclosure.

FIG. 15A shows a method for indicating an order between TCI states according to method 1 according to an embodiment of the disclosure.

Referring to FIG. 15A, according to the method 1, the order of the indicated TCI states can be distinguished on the DCI code point.

Figure 15B:
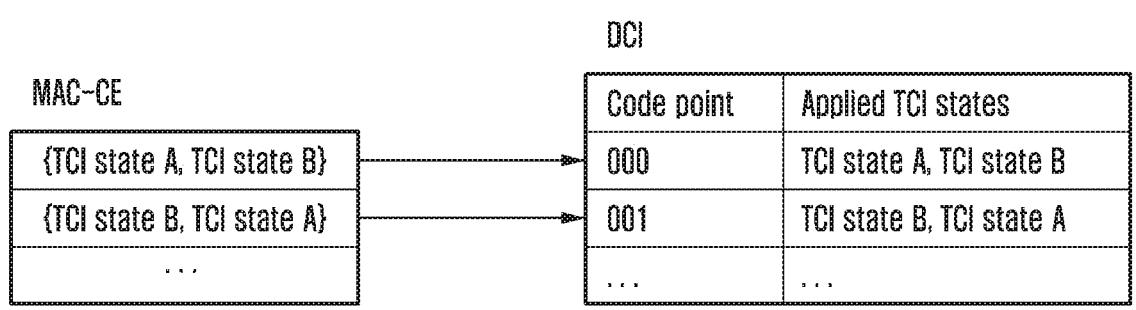

FIG. 15B shows a method for indicating an order between TCI states according to method 2 according to an embodiment of the disclosure.

Referring to FIG. 15B, according to the method 2, the order of the indicated TCI states can be distinguished on the MAC-CE.

In the case of method 1, the number of DCI code points may be larger than the number of sets of TCI states activated using MAC-CE, and in the case of method 2, the number of sets of TCI states activated using MAC-CE may be the same as the number of DCI code points.

Third Embodiment: New Antenna Port Indication Method 3

A third embodiment proposes a method of performing new antenna port indication by designing new code points so as to exclude the problem described in the first embodiment, based on a series of rules.

The terminal may recognize whether or not NC-JT is performed through a method other than the DMRS port indication, for example, through one of the methods listed below or a combination thereof.
  The number of indicated TCI states: If the number of TCI states configured as a DCI code point is two or more, NC-JT is performed, and if the number of TCI states configured as a DCI code point is one, single-TRP transmission is performed.
  RNTI value: The case in which an RNTI for NC-JT and an RNTI for single-TRP transmission are distinguished.

If the terminal determines that the current transmission is NC-JT according to the above method, the tables listed below may be used as tables indicating the antenna ports on the DCI. The tables listed below may be designed by one of the rules, which will be proposed below, or a combination thereof.

Rule A) The proposed rule A is a method of always using fixed CDM groups 0 and 1, regardless of the type of DMRS, and the respective CDM groups are mapped to different TRPs.

Rule A-1) In Table 17-1<DMRS type1, maxlength=1>, a total of two to four DMRS ports are allocated, and at least one DMRS port is allocated to each CDM group. The allocated DMRS ports are ranged from 0 to 3. If a total of two DMRS ports are used, the respective DMRS ports become DMRS ports having the same frequency domain cyclic shift or frequency domain OCC in different CDM groups. For example, two DMRS ports may be ports 0 and 2 that have the same frequency domain OCC w_f=[1,1] in CDM groups 0 and 1, respectively, and may be ports 1 and 3 that use w_f=[1, −1]. On the other hand, since the DMRS ports 0 and 3 have different frequency domain OCCs w_f= [1,1] and w_f=[1, −1] in CDM groups 0 and 1, the corresponding ports are unable to be combined. If a total of three DMRS ports are used, the case in which two DMRS ports are used in CDM group 0 and one DMRS port is used in CDM group 1 (code point 2), and the reverse case thereof (code point 3) will be considered. If four DMRS ports are used, two DMRS ports are used both in CDM Group 0 and in CDM group 1.

TABLE 17-1

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
| --- | --- | --- |
| 0 | 2 | 0, 2 |
| 1 | 2 | 1, 3 |
| 2 | 2 | 0, 1, 2 |
| 3 | 2 | 0, 2, 3 |
| 4 | 2 | 0-3 |
| 5-15 | Reserved | Reserved |

Rule A-2) In Table 17-2<DMRS type1, maxlength=2, one codeword>, a total of 2 to 4 DMRS ports are allocated, and at least one DMRS port is allocated to each CDM group. According to the number of front-loaded symbols, in the case of one front-loaded symbol, allocation is performed on DMRS ports 0 to 3, and in the case of two front-loaded symbols, allocation is performed on DMRS ports 0 to 7. If a total of two DMRS ports are used, like Rule A-1, the frequency domain OCCs in the respective CDM groups must be the same. Meanwhile, the time domain OCCs of the respective CDM groups may be the same or different. For example, both DMRS port 0 and DMRS port 2, which use the same time domain OCC, may be used in CDM groups {0, 1}, respectively, and both DMRS port 0 and DMRS port 6, which use different time domain OCCs, may also be used therein. Rule A-1 is applied to the case where three or more DMRS ports are used in total. In this case, the time domain OCCs applied to the respective ones of CDM groups {0,1} may be the same or different.

Rule A-3) A total of 5 to 8 DMRS ports are allocated in Table 17-2 <DMRS type1, maxlength=2, two codewords>, and the DMRS ports to be used are limited to a union of the DMRS ports corresponding to two or more code points in Table <xx-a2, DMRS type1, maxlength=2, one codeword>. For example, since the DMRS ports {0, 3, 4, 5, 6} are not a union of the DMRS ports corresponding to the code points in Table <xx-a2, DMRS type 1, maxlength=2, one codeword>, the corresponding ports are unable to be used.

TABLE 17-2

DMRS indication table for antenna port(s)
(1000 + DMRS port), dmrs-Type = 1, maxLength = 2

| | One Codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 2 | 0, 2 | 1 | 0 | 2 | 0, 1, 2, 3, 4 | 2 |
| 1 | 2 | 1, 3 | 1 | 1 | 2 | 1, 2, 3, 4, 6 | 2 |
| 2 | 2 | 0, 1, 2 | 1 | 2 | 2 | 0, 1, 2, 3, 4, 5, 6 | 2 |
| 3 | 2 | 0, 2, 3 | 1 | 3 | 2 | 0, 1, 2, 3, 4, 5, 6, 7 | 2 |
| 4 | 2 | 0-3 | 1 | 4-31 | reserved | reserved | reserved |
| 5 | 2 | 0, 2 | 2 | | | | |
| 6 | 2 | 1, 3 | 2 | | | | |
| 7 | 2 | 4, 6 | 2 | | | | |
| 8 | 2 | 5, 7 | 2 | | | | |
| 9 | 2 | 0, 6 | 2 | | | | |
| 10 | 2 | 1, 7 | 2 | | | | |
| 11 | 2 | 2, 4 | 2 | | | | |
| 12 | 2 | 3, 5 | 2 | | | | |
| 13 | 2 | 0, 1, 2 | 2 | | | | |
| 14 | 2 | 0, 2, 3 | 2 | | | | |
| 15 | 2 | 0, 1, 6 | 2 | | | | |
| 18 | 2 | 0, 6, 7 | 2 | | | | |
| 17 | 2 | 2, 4, 5 | 2 | | | | |
| 18 | 2 | 2, 3, 4 | 2 | | | | |
| 19 | 2 | 4, 5, 6 | 2 | | | | |
| 20 | 2 | 4, 6, 7 | 2 | | | | |
| 21 | 2 | 0-3 | 2 | | | | |
| 22 | 2 | 4-7 | 2 | | | | |
| 23 | 2 | 0, 1, 6, 7 | 2 | | | | |
| 24 | 2 | 2, 3, 4, 5 | 2 | | | | |
| 25-31 | Reserved | Reserved | Reserved | | | | |

Rule A-4) In Table 17-3<DMRS type2, maxlength=1>, a total of two to four DMRS ports are allocated when one codeword is used, and at least one DMRS port is allocated to CDM groups 0 and 1. In addition, the frequency domain OCC condition mentioned in Rule A-1 is applied thereto. If two codewords are used, the DMRS port union condition mentioned in Rule A-3 is applied thereto.

TABLE 17-3

DMRS indication table for antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 2 | 0, 2 | 0 | 3 | 0-4 |
| 1 | 2 | 1, 3 | 1 | 3 | 0-5 |
| 2 | 2 | 0, 1, 2 | 2-31 | reserved | reserved |
| 3 | 2 | 0, 2, 3 | | | |
| 4 | 2 | 0-3 | | | |
| 5 | 3 | 0, 2 | | | |
| 6 | 3 | 1, 3 | | | |
| 7 | 3 | 0, 1, 2 | | | |
| 8 | 3 | 0, 2, 3 | | | |
| 9 | 3 | 0-3 | | | |
| 10-31 | Reserved | Reserved | | | |

Rule A-5) In Table 17-4<DMRS type2, maxlength=2>, a total of 2 to 4 DMRS ports are allocated, and at least one DMRS port is allocated to CDM groups 0 and 1. If one codeword is used, the frequency domain OCC condition mentioned in Rule A-1 and the time domain OCC condition mentioned in Rule A-2 are applied thereto. If two codewords are used, the DMRS port union condition mentioned in Rule A-3 is applied thereto.

TABLE 17-4

DMRS indication table for antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 2 | 0, 2 | 1 | 0 | 3 | 0-4 | 1 |
| 1 | 2 | 1, 3 | 1 | 1 | 3 | 0-5 | 1 |
| 2 | 2 | 0, 1, 2 | 1 | 2 | 2 | 0, 1, 2, 3, 6 | 2 |
| 3 | 2 | 0, 2, 3 | 1 | 3 | 2 | 1, 2, 3, 6, 8 | 2 |
| 4 | 2 | 0-3 | 1 | 4 | 2 | 0, 1, 2, 3, 6, 7, 8 | 2 |
| 5 | 3 | 0, 2 | 1 | 5 | 2 | 0, 1, 2, 3, 6, 7, 8, 9 | 2 |
| 6 | 3 | 1, 3 | 1 | 6-63 | Reserved | Reserved | Reserved |
| 7 | 3 | 0, 1, 2 | 1 | | | | |
| 8 | 3 | 0, 2, 3 | 1 | | | | |
| 9 | 3 | 0-3 | 1 | | | | |
| 10 | 2 | 0, 2 | 2 | | | | |
| 11 | 2 | 1, 3 | 2 | | | | |
| 12 | 2 | 0, 1, 2 | 2 | | | | |
| 13 | 2 | 0, 2, 3 | 2 | | | | |
| 14 | 2 | 0-3 | 2 | | | | |
| 15 | 3 | 0, 2 | 2 | | | | |
| 16 | 3 | 1, 3 | 2 | | | | |
| 17 | 3 | 0, 1, 2 | 2 | | | | |
| 18 | 3 | 0, 2, 3 | 2 | | | | |
| 19 | 3 | 0-3 | 2 | | | | |
| 20 | 2 | 6, 8 | 2 | | | | |
| 21 | 2 | 7, 9 | 2 | | | | |
| 22 | 2 | 6, 7, 8 | 2 | | | | |
| 23 | 2 | 6, 8, 9 | 2 | | | | |
| 24 | 2 | 6-9 | 2 | | | | |
| 25 | 3 | 6, 8 | 2 | | | | |
| 26 | 3 | 7, 9 | 2 | | | | |
| 27 | 3 | 6, 7, 8 | 2 | | | | |
| 28 | 3 | 6, 8, 9 | 2 | | | | |
| 29 | 3 | 6-9 | 2 | | | | |
| 30 | 3 | 0, 8 | 2 | | | | |
| 31 | 3 | 1, 9 | 2 | | | | |
| 32 | 3 | 2, 6 | 2 | | | | |
| 33 | 3 | 3, 7 | 2 | | | | |
| 34 | 3 | 0, 1, 8 | 2 | | | | |
| 35 | 3 | 0, 8, 9 | 2 | | | | |
| 36 | 3 | 2, 3, 6 | 2 | | | | |
| 37 | 3 | 2, 6, 7 | 2 | | | | |
| 38 | 3 | 0, 1, 8, 9 | 2 | | | | |
| 39 | 3 | 2, 3, 6, 7 | 2 | | | | |
| 40-63 | Reserved | Reserved | Reserved | | | | |

Rule B) The proposed Rule B is a method of always using two CDM groups, using CDM groups 0 and 1 in the case of DMRS type 1, and dynamically selecting and using two CDM groups from among CDM groups 0, 1, and 2 in the case of DMRS type 2. In this case, the respective selected CDM groups may be mapped to different TRPs.

Rule A-1) described above is applied to Table 18-1<DMRS type1, maxlength=1>.

TABLE 18-1

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 2 | 0, 2 |
| 1 | 2 | 1, 3 |

TABLE 18-1-continued

DMRS indication table for antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 2 | 2 | 0, 1, 2 |
| 3 | 2 | 0, 2, 3 |
| 4 | 2 | 0-3 |
| 5-15 | Reserved | Reserved |

Rule A-2) is applied to Table 18-2<DMRS type1, max-length=2> in the case of one codeword, and Rule A-3) is applied to the same in the case of two codewords.

TABLE 18-2

DMRS indication table for antenna port(s) (1000 + DMRS port), dmrs-Type = 1, maxLength = 2

| | One Codeword: Codeword 0 enabled, Codeword 1 disabled | | | | Two Codewords; Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 2 | 0, 2 | 1 | 0 | 2 | 0, 1, 2, 3, 4 | 2 |
| 1 | 2 | 1, 3 | 1 | 1 | 2 | 0, 1, 2, 3, 4, 6 | 2 |
| 2 | 2 | 0, 1, 2 | 1 | 2 | 2 | 0, 1, 2, 3, 4, 5, 6 | 2 |
| 3 | 2 | 0, 2, 3 | 1 | 3 | 2 | 0, 1, 2, 3, 4, 5, 6, 7 | 2 |
| 4 | 2 | 0-3 | 1 | 4-31 | reserved | reserved | reserved |
| 5 | 2 | 0, 2 | 2 | | | | |
| 6 | 2 | 1, 3 | 2 | | | | |
| 7 | 2 | 4, 6 | 2 | | | | |
| 8 | 2 | 5, 7 | 2 | | | | |
| 9 | 2 | 0, 6 | 2 | | | | |
| 10 | 2 | 1, 7 | 2 | | | | |
| 11 | 2 | 2, 4 | 2 | | | | |
| 12 | 2 | 3, 5 | 2 | | | | |
| 13 | 2 | 0, 1, 2 | 2 | | | | |
| 14 | 2 | 0, 2, 3 | 2 | | | | |
| 15 | 2 | 0, 1, 6 | 2 | | | | |
| 16 | 2 | 0, 6, 7 | 2 | | | | |
| 17 | 2 | 2, 4, 5 | 2 | | | | |
| 18 | 2 | 2, 3, 4 | 2 | | | | |
| 19 | 2 | 4, 5, 6 | 2 | | | | |
| 20 | 2 | 4, 6, 7 | 2 | | | | |
| 21 | 2 | 0-3 | 2 | | | | |
| 22 | 2 | 4-7 | 2 | | | | |
| 23 | 2 | 0, 1, 6, 7 | 2 | | | | |
| 24 | 2 | 2, 3, 4, 5 | 2 | | | | |
| 25-31 | Reserved | Reserved | Reserved | | | | |

Rule B-1) In Table 18-3<DMRS type2, maxlength=1, one codeword>, if the number of DMRS CDM groups without data is 2, CDM group set {0, 1} is used, and if the number of DMRS CDM groups without data is 3, one of CDM group sets {0, 1}, {0, 2}, and {1, 2} is selected and used. After the CDM group set is selected, Rule A-4) is applied. Rule A-4) is applied to Table 18-3<DMRS type2, maxlength=1, two codewords>.

TABLE 18-3

DMRS indication table for antenna port(s) (1000 + DMRS port), dmrs-Type = 2, maxLength = 1

| | One codeword: Codeword 0 enabled Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 2 | 0, 2 | 0 | 3 | 0-4 |
| 1 | 2 | 1, 3 | 1 | 3 | 0-5 |
| 2 | 2 | 0, 1, 2 | 2-31 | reserved | reserved |
| 3 | 2 | 0, 2, 3 | | | |
| 4 | 2 | 0-3 | | | |
| 5 | 3 | 0, 2 | | | |
| 6 | 3 | 1, 3 | | | |
| 7 | 3 | 0, 1, 2 | | | |
| 8 | 3 | 0, 2, 3 | | | |
| 9 | 3 | 0-3 | | | |
| 10 | 3 | 0, 4 | | | |

TABLE 18-3-continued

DMRS indication table for antenna port(s) (1000 + DMRS port), dmrs-Type = 2, maxLength = 1

| | One codeword: Codeword 0 enabled Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 11 | 3 | 1, 5 | | | |
| 12 | 3 | 0, 1, 4 | | | |
| 13 | 3 | 0, 4, 5 | | | |
| 14 | 3 | 0, 1, 4, 5 | | | |
| 15 | 3 | 2, 4 | | | |
| 16 | 3 | 3, 5 | | | |
| 17 | 3 | 2, 3, 4 | | | |
| 18 | 3 | 2, 4, 5 | | | |
| 19 | 3 | 2, 3, 4, 5 | | | |
| 20-31 | Reserved | Reserved | | | |

Rule B-2) In Table 18-4<DMRS type2, maxlength=2, one codeword>, like Rule B-1) above, a CDM group set is selected. After the CDM group set is selected, the respective CDM groups are restricted so as to use only the same time-domain OCC in order to prevent an increase in the DCI payload required to support the different time domain OCCs for the respective CDM groups. Otherwise, Rule A-5) is applied. Rule A-5 described above is applied to Table 18-4<DMRS type2, maxlength=2, two codewords>.

TABLE 18-4

DMRS indication table for antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 2 | 0, 2 | 1 | 0 | 3 | 0-4 | 1 |
| 1 | 2 | 1, 3 | 1 | 1 | 2 | 0-5 | 1 |
| 2 | 2 | 0, 1, 2 | 1 | 2 | 2 | 0, 1, 2, 3, 6 | 2 |
| 3 | 2 | 0, 2, 3 | 1 | 3 | 2 | 0, 1, 2, 3, 6, 8 | 2 |
| 4 | 2 | 0-3 | 1 | 4 | 2 | 0, 1, 2, 3, 6, 7, 8 | 2 |
| 5 | 3 | 0, 2 | 1 | 5 | 2 | 0, 1, 2, 3, 6, 7, 8, 9 | 2 |
| 6 | 3 | 1, 3 | 1 | 6-63 | Reserved | Reserved | Reserved |
| 7 | 3 | 0, 1, 2 | 1 | | | | |
| 8 | 3 | 0, 2, 3 | 1 | | | | |
| 9 | 3 | 0-3 | 1 | | | | |
| 10 | 3 | 0, 4 | 1 | | | | |
| 11 | 3 | 1, 5 | 1 | | | | |
| 12 | 3 | 0, 1, 4 | 1 | | | | |
| 13 | 3 | 0, 4, 5 | 1 | | | | |
| 14 | 3 | 0, 1, 4, 5 | 1 | | | | |
| 15 | 3 | 2, 4 | 1 | | | | |
| 16 | 3 | 3, 5 | 1 | | | | |
| 17 | 3 | 2, 3, 4 | 1 | | | | |
| 18 | 3 | 2, 4, 5 | 1 | | | | |
| 19 | 3 | 2, 3, 4, 5 | 1 | | | | |
| 20 | 2 | 0, 2 | 2 | | | | |
| 21 | 2 | 1, 3 | 2 | | | | |
| 22 | 2 | 0, 1, 2 | 2 | | | | |
| 23 | 2 | 0, 2, 3 | 2 | | | | |
| 24 | 2 | 0-3 | 2 | | | | |
| 25 | 3 | 0, 2 | 2 | | | | |

TABLE 18-4-continued

DMRS indication table for antenna port(s)
(1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 26 | 3 | 1, 3 | 2 | | | | |
| 27 | 3 | 0, 1, 2 | 2 | | | | |
| 28 | 3 | 0, 2, 3 | 2 | | | | |
| 29 | 3 | 0-3 | 2 | | | | |
| 30 | 3 | 0, 4 | 2 | | | | |
| 31 | 3 | 1, 5 | 2 | | | | |
| 32 | 3 | 0, 1, 4 | 2 | | | | |
| 33 | 3 | 0, 4, 5 | 2 | | | | |
| 34 | 3 | 0, 1, 4, 5 | 2 | | | | |
| 35 | 3 | 2, 4 | 2 | | | | |
| 36 | 3 | 3, 5 | 2 | | | | |
| 37 | 3 | 2, 3, 4 | 2 | | | | |
| 38 | 3 | 2, 4, 5 | 2 | | | | |
| 39 | 3 | 2, 3, 4, 5 | 2 | | | | |
| 40 | 2 | 6, 8 | 2 | | | | |
| 41 | 2 | 7, 9 | 2 | | | | |
| 42 | 2 | 6, 7, 8 | 2 | | | | |
| 43 | 2 | 6, 8, 9 | 2 | | | | |
| 44 | 2 | 6-9 | 2 | | | | |
| 45 | 3 | 6, 8 | 2 | | | | |
| 46 | 3 | 7, 9 | 2 | | | | |
| 47 | 3 | 6, 7, 8 | 2 | | | | |
| 48 | 3 | 6, 8, 9 | 2 | | | | |
| 49 | 3 | 6-9 | 2 | | | | |
| 50 | 3 | 6, 10 | 2 | | | | |
| 51 | 3 | 7, 11 | 2 | | | | |
| 52 | 3 | 6, 7, 10 | 2 | | | | |
| 53 | 3 | 6, 10, 11 | 2 | | | | |
| 54 | 3 | 6, 7, 10, 11 | 2 | | | | |
| 55 | 3 | 8, 10 | 2 | | | | |
| 56 | 3 | 9, 11 | 2 | | | | |
| 57 | 3 | 8, 9, 10 | 2 | | | | |
| 58 | 3 | 8, 10, 11 | 2 | | | | |
| 59 | 3 | 8, 9, 10, 11 | 2 | | | | |
| 60-63 | Reserved | Reserved | Reserved | | | | |

Some DCI code points in Rule A or Rule B may be used to support multi-user MIMO transmission between NC-JT terminals or multi-user MIMO transmission between an NC-JT terminal and a single-TRP terminal. For example, code points 0 and 1 in Table 18-1 may be indicated to different terminals A and B, respectively, and the base station may provide services to terminals A and B by an NC-JT multi-user MIMO transmission method. Alternatively, code point 5 in Table 18-3 may be indicated to terminal C that receives data by an NC-JT method, and code point 15 in Table 15-3-1 may be indicated to terminal D that receives data by a single-TRP method, and the base station may provide services to terminals C and D by a multi-user MIMO transmission method. The code points supporting the multi-user MIMO transmission between the NC-JT terminals, among the DCI code points according to Rule A or Rule B, may be all the code points in which one or more CDM groups overlap each other. Meanwhile, the code points supporting the multi-user MIMO transmission between the NC-JT terminal and the single-TRP terminal, among the code points, may be all the code points in which a value of the field "CDM group(s) without data" is larger than the number of CDM groups that are actually used.

Meanwhile, the NC-JT may be used in the case where a plurality of TRPs serves a single UE because the traffic load is relatively low, and the multi-user MIMO may be used in the case where a single TRP serves a plurality of UEs because the traffic load is relatively high. Accordingly, in the case where the NC-JT is used, it is possible to not consider the multi-user MIMO transmission between the NC-JT terminals or between the NC-JT terminal and the single-TRP terminal, and in this case, the DCI code points for the multi-user MIMO transmission may be omitted.

According to an embodiment, only some of the DCI code points may be omitted. That is, i) only the DCI code points for the multi-user MIMO between the NC-JT terminals may be omitted, ii) only the DCI code points for the multi-user MIMO between the NC-JT terminal and the single-TRP terminal may be omitted, or iii) all of the DCI code points for the multi-user MIMO may be omitted. One of the methods for case i) is omitting all code points having one or more CDM groups overlapping each other and having the same total number of DMRS ports, except for one thereof. One of the methods for case ii) is omitting all code points having a value of the field "CDM group(s) without data" larger than the number of CDM groups actually used.

Fourth Embodiment: Method of Selecting One of Antenna Port Indication of the Related Art and New Antenna Port Indication A fourth embodiment provides methods for the terminal to determine whether to use antenna port indication of the related art or new antenna port indication according to the situation.

New antenna port indication according to some of the embodiments is to convert the content indicated by some or all of the antenna port indication code points of the related art (i.e., the number of DMRS CDM groups without data or DMRS port numbers) to new content in order to efficiently support NC-JT. If the new antenna port indication is used, some or all of the functions of the antenna port indication of the related art are unable to be used. This means that the degree of freedom of multi-user MIMO transmission or single-user MIMO transmission may deteriorate at a specific time for supporting NC-JT, compared to the existing transmission, and thus it is necessary to modify the antenna port indication method according to the situation and apply the same.

Specifically, the base station and the terminal may agree with each other such that when a certain PDCCH allocates NC-JT PDSCHs (that is, when a single PDCCH allocates two or more PDSCHs to the same serving cell and the same bandwidth part at the same time), the antenna port indication method is determined according to values of some fields in the DCI included in the corresponding PDCCH. The agreement between the base station and the terminal may be performed on the terminal that reports to the base station that single-PDCCH-based NC-JT reception is possible.

Figure 10:
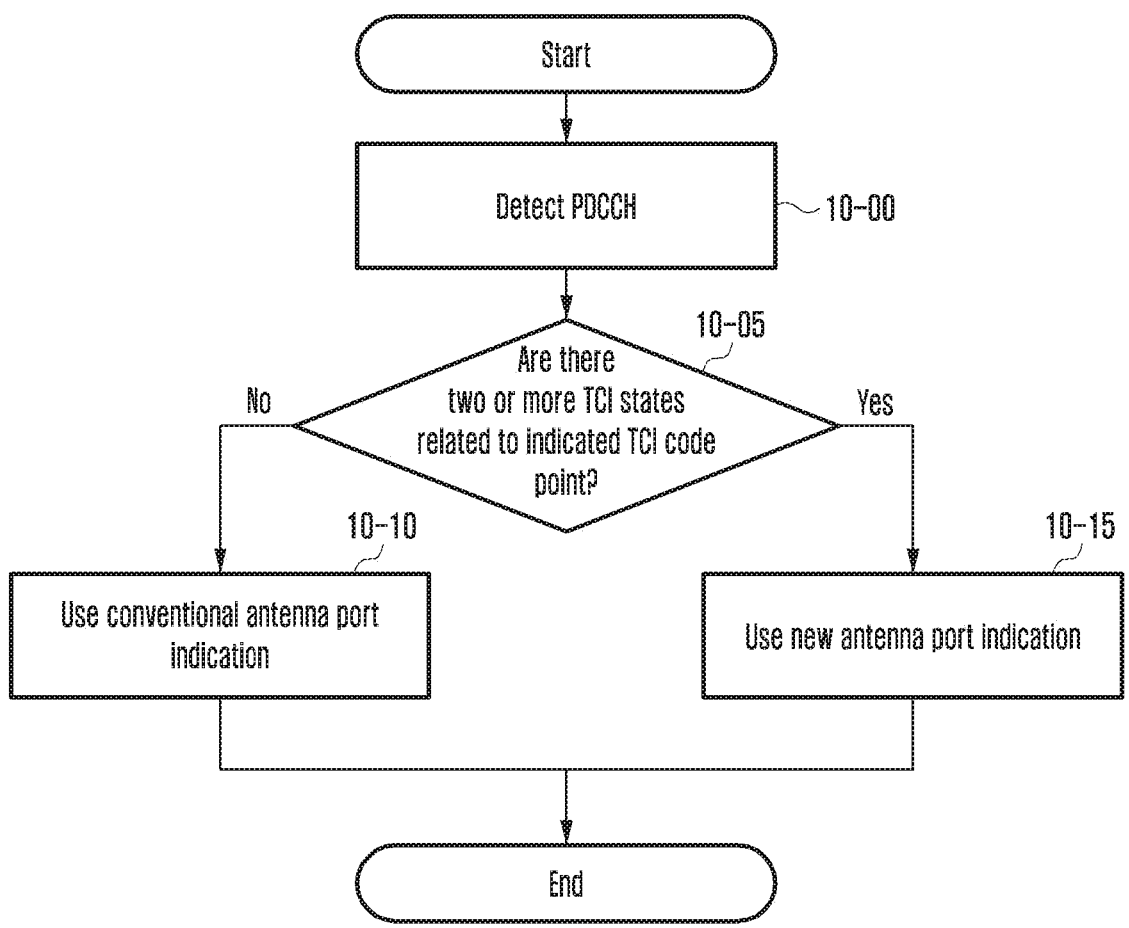
FIG. 10 is a diagram illustrating a method for determining whether to use antenna port indication of the related art or new antenna port indication according to an embodiment of the disclosure.

FIG. 10 is a diagram illustrating a method of determining antenna port indication according to an embodiment of the disclosure.

Referring to FIG. 10, the terminal attempts to detect a PDCCH (10-00) and determines whether there are two or more TCI states related to the TCI code point indicated by detected DCI (10-05).

If there is only one TCI state related to the indicated TCI code point, the terminal assumes that antenna port indication of the related art is used (10-10).

On the other hand, if there are two (or two or more) TCI states related to the indicated TCI code point, the terminal assumes that new antenna port indication is used (10-15).

This may be understood that if the TCI code point related to the single TCI state is indicated, the terminal does not expect the use of the new antenna port indication or expects to use only the code point indicating the same content as the antenna port indication of the related art in the new antenna port indication. According to this, even in the case of using the NC-JT DCI that is distinguished by RNTI allocation, DCI formats, the payload of a specific field in DCI, content thereof, or the like (e.g., the NC-JT DCI capable of indicating TCI code points related to two or more TCI states at a time), it is possible to use all functions of the antenna port indication of the related art.

As another example, the base station and the terminal may agree with each other so as to determine the antenna port indication method according to a higher layer signaling configuration value such as RRC or MAC CE. The agreement between the base station and the terminal may be performed on the terminal that reports to the base station that the single-PDCCH-based NC-JT reception is possible.

Figure 11:
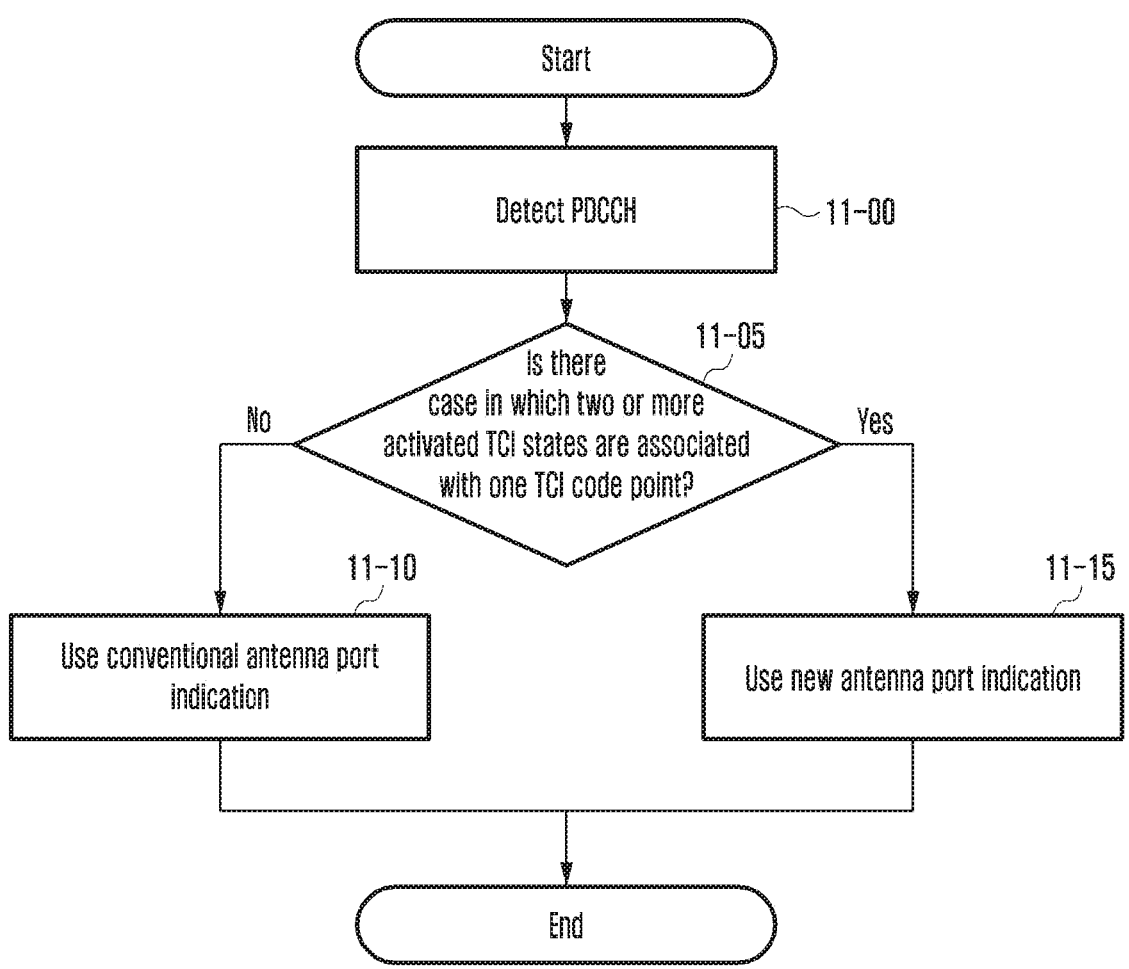
FIG. 11 is a diagram illustrating a method for determining whether to use antenna port indication of the related art or new antenna port indication according to an embodiment of the disclosure.

FIG. 11 is a diagram illustrating a method of determining antenna port indication according to an embodiment of the disclosure.

Referring to FIG. 11, the terminal attempts to detect a PDCCH (11-00) and determines whether or not there is the case in which two or more TCI states activated through MAC CE are associated with one TCI code point (11-05).

If there is no case in which two or more activated TCI states are associated with one TCI code point (i.e., the case in which all the TCI code points have only one associated TCI state), the terminal assumes that antenna port indication of the related art is used (11-10).

On the other hand, if there is the case in which two or more activated TCI states are associated with one TCI code point (i.e., the case in which at least one TCI code point has two or more associated TCI states), the terminal assumes that new antenna port indication is used (11-15). Accordingly, even if new antenna port indication is indicated through RRC configuration, the terminal is capable of using all of the functions of the antenna port indication of the related art, based on MAC CE signaling, thereby performing more flexible scheduling.

As another example, the base station and the terminal may agree with each other so as to determine the antenna port indication method according to the usage of NC-JT DCI distinguished by RNTI allocation, DCI formats, the payload of a specific field in DCI, content thereof, or the like (e.g., the NC-JT DCI capable of indicating TCI code points related to two or more TCI states at a time). The agreement between the base station and the terminal may be performed on the terminal that reports to the base station that the single-PDCCH-based NC-JT reception is possible.

Figure 12:
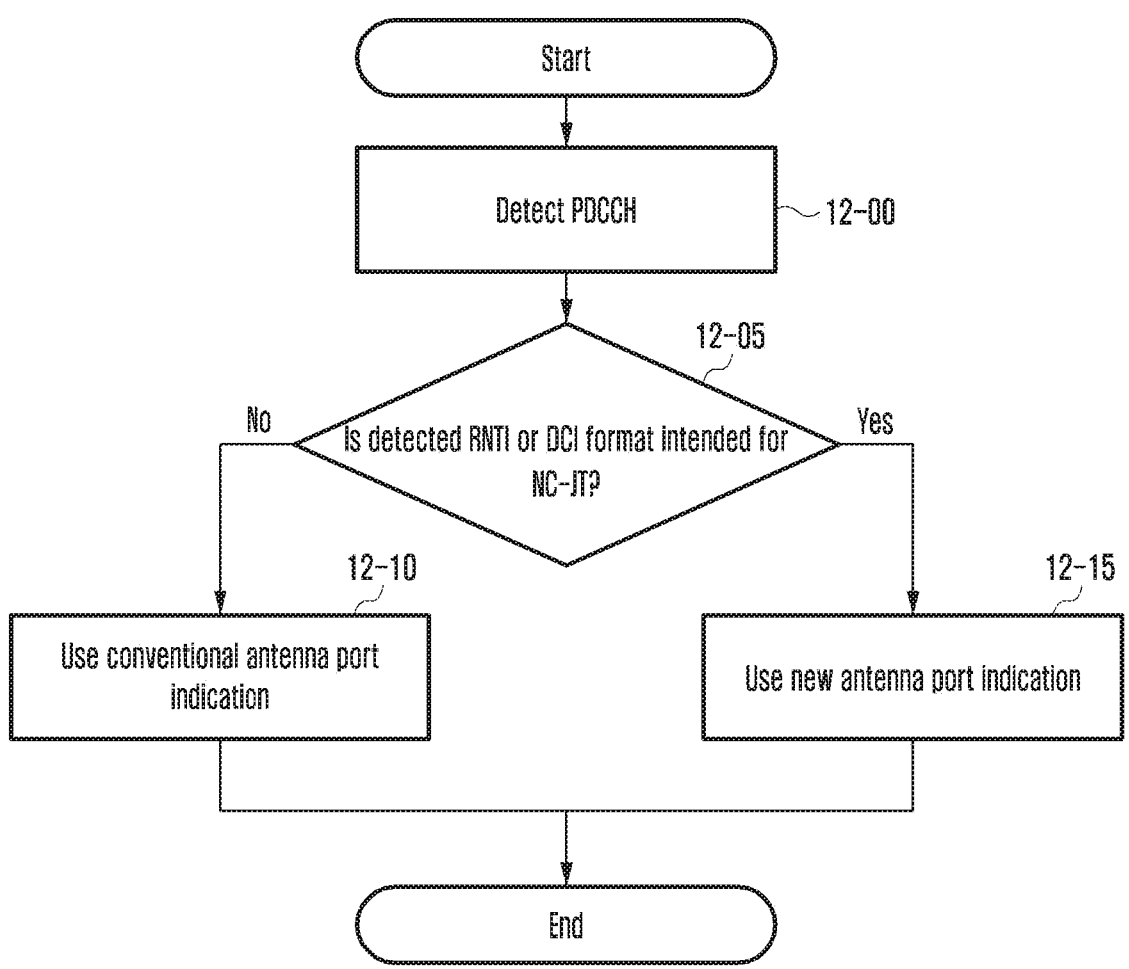
FIG. 12 is a diagram illustrating a method for determining whether to use antenna port indication of the related art or new antenna port indication according to an embodiment of the disclosure.

FIG. 12 is a diagram illustrating a method of determining antenna port indication according to an embodiment of the disclosure.

Referring to FIG. 12, the terminal attempts to detect a PDCCH (12-00) and determines whether or not the detected PDCCH includes the DCI for NC-JT (12-05).

If the detected DCI is not intended for the single-PDCCH-based NC-JT, the terminal assumes that antenna port indication of the related art is used (12-10).

On the other hand, if the detected DCI is intended for the single-PDCCH-based NC-JT, the terminal assumes that new antenna port indication is used (12-15). Accordingly, the terminal is capable of dynamically selecting the antenna port indication method depending on the type of DCI, thereby performing more flexible scheduling.

Figure 13:
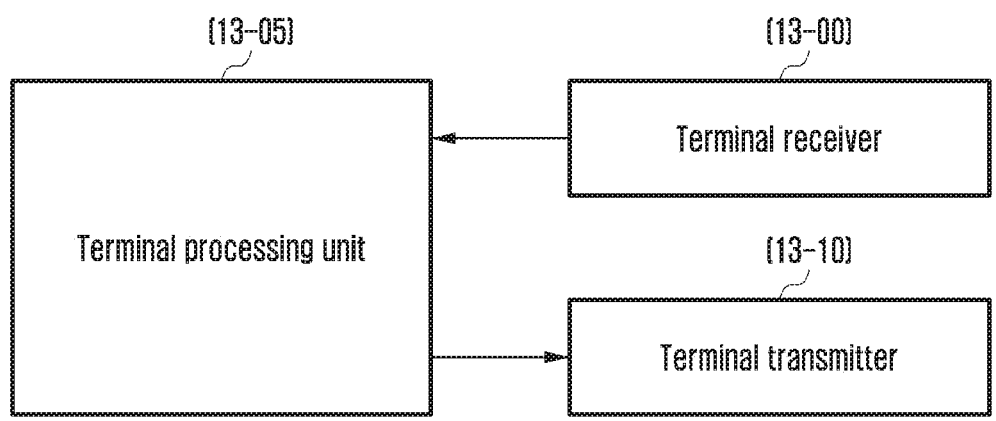
FIG. 13 illustrates the structure of a terminal in a wireless communication system according to an embodiment of the disclosure.

FIG. 13 is a block diagram illustrating the structure of a terminal in a wireless communication system according to an embodiment of the disclosure.

Referring to FIG. 13, a terminal may be configured to include a transceiver 13-00 and 13-10, and a processing unit 13-05 including a memory and a processor. The transceiver 13-00 and 13-10 and the processing unit 13-05 of the terminal may operate according to the communication method of the terminal as described above. However, the elements of the terminal are not limited to the above-described examples. For example, the terminal may include more elements or fewer elements than the aforementioned elements. In addition, the transceiver 13-00 and 13-10, and the processing unit 13-05 may be implemented in a single chip.

The transceiver 13-00 and 13-10 may transmit and receive signals to and from a base station. The signal may include control information and data. To this end, the transceiver 13-00 and 13-10 may be configured to include an RF transmitter for up-converting and amplifying the frequency of a transmitted signal, and an RF receiver for low-noise-amplifying a received signal and down-converting the frequency thereof. However, this is only an example of the transceiver 13-00 and 13-10, and the elements of the transceiver 13-00 and 13-10 are not limited to the RF transmitter and the RF receiver.

In addition, the transceiver 13-00 and 13-10 may receive a signal through a wireless channel, may output the signal to the processing unit 13-05, and may transmit a signal output from the processing unit 13-05 through a wireless channel.

The processing unit 13-05 may store programs and data necessary for the operation of the terminal. In addition, the processing unit 13-05 may store control information or data included in the signal obtained from the terminal. The processing unit 13-05 may include a memory configured as a storage medium, such as ROM, RAM, a hard disk, CD-ROM, and a DVD, or a combination thereof.

In addition, the processing unit 13-05 may control a series of processes such that the terminal may operate according to the above-described embodiment. According to some embodiments, the processing unit 13-05 may determine whether or not to apply a new antenna port indication method, and may control the elements of the terminal so as to apply the new antenna port indication according thereto.

Figure 14:
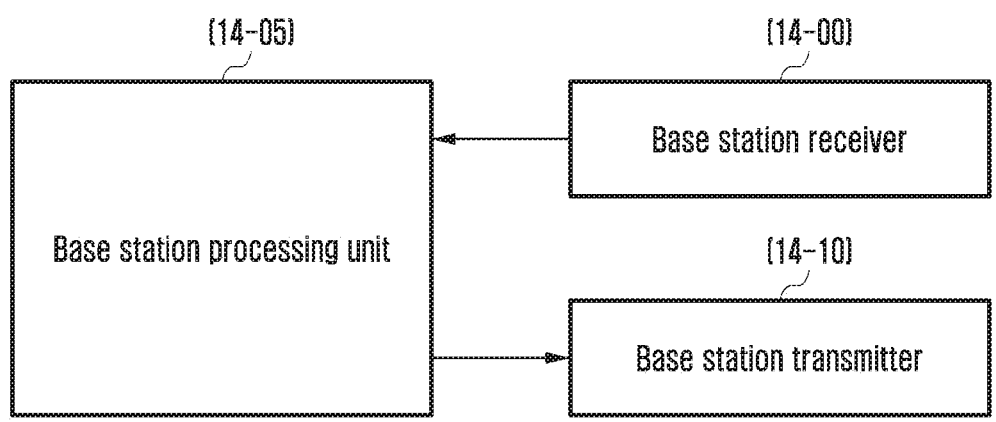
FIG. 14 illustrates the structure of a base station in a wireless communication system according to an embodiment of the disclosure.

FIG. 14 is a block diagram illustrating the structure of a base station in a wireless communication system according to an embodiment of the disclosure.

Referring to FIG. 14, a base station may be configured to include a transceiver 14-00 and 14-10, and a processing unit 14-05 including a memory and a processor. The transceiver 14-00 and 14-10 and the processing unit 14-05 of the base station may operate according to the communication method of the base station as described above. However, the elements of the base station are not limited to the above-described examples. For example, the base station may include more elements or fewer elements than the aforementioned elements. In addition, the transceiver 14-00 and 14-10 and the processing unit 14-05 may be implemented in a single chip.

The transceiver 14-00 and 14-10 may transmit and receive signals to and from a terminal. The signal may include control information and data. To this end, the transceiver 14-00 and 14-10 may be configured to include an RF transmitter for up-converting and amplifying the frequency of a transmitted signal, and an RF receiver for low-noise-amplifying a received signal and down-converting the frequency thereof. However, this is only an example of the transceiver 14-00 and 14-10, and the elements of the transceiver 14-00 and 14-10 are not limited to the RF transmitter and the RF receiver.

In addition, the transceiver 14-00 and 14-10 may receive a signal through a wireless channel, may output the signal to the processing unit 14-05, and may transmit a signal output from the processing unit 14-05 through a wireless channel.

The processing unit 14-05 may store programs and data necessary for the operation of the base station. In addition, the processing unit 14-05 may store control information or data included in the signal obtained from the base station. The processing unit 14-05 may include a memory configured as a storage medium, such as ROM, RAM, a hard disk, CD-ROM, and a DVD, or a combination thereof.

In addition, the processing unit 14-05 may control a series of processes such that the base station may operate according to the above-described embodiment. According to some embodiments, the processing unit 14-05 may determine whether or not to apply a new antenna port indication method, and may control the respective elements of the base station so as to apply the new antenna port indication according thereto.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a communication system, the method comprising:
  receiving, from a base station, configuration information associated with a demodulation reference signal (DMRS) for receiving data;
  receiving, from the base station, control information including an indicator associated with at least one DMRS port and a transmission configuration indication (TCI) field;
  identifying a DMRS port allocated to the terminal based on the configuration information, the indicator and whether at least one codepoint associated with the TCI field corresponds to a plurality of TCI states; and
  receiving, from the base station, the data based on the identified DMRS port.

2. The method of claim 1, wherein the DMRS port allocated to the terminal is identified based on a first antenna port indication, in case that all the codepoint associated with the TCI field corresponds to up to one TCI state.

3. The method of claim 1, wherein the DMRS port allocated to the terminal is identified based on a second antenna port indication, in case that at least one codepoint associated with the TCI field corresponds to the plurality of TCI states.

4. The method of claim 3, wherein each of information associated with the second antenna port indication includes an entry corresponding to DMRS port index 1000, 1002 and 1003.

5. The method of claim 1, wherein each of the plurality of TCI states corresponds to different code division multiplexing (CDM) group, in case that a codepoint indicated by the TCI field corresponds to the plurality of TCI states and identified DMRS ports correspond to a plurality of CDM groups.

6. A method of a base station in a communication system, the method comprising:
  transmitting, to a terminal, configuration information associated with a demodulation reference signal (DMRS) for transmitting data;
  transmitting, to the terminal, control information including an indicator associated with at least one DMRS port and a transmission configuration indication (TCI) field;
  identifying a DMRS port allocated to the terminal based on the configuration information, the indicator and whether at least one codepoint associated with the TCI field corresponds to a plurality of TCI states; and
  transmitting, to the terminal, the data based on the identified DMRS port.

7. The method of claim 6, wherein the DMRS port allocated to the terminal is identified based on a first antenna port indication, in case that all the codepoint associated with the TCI field corresponds to up to one TCI state.

8. The method of claim 6, wherein the DMRS port allocated to the terminal is identified based on a second antenna port indication, in case that at least one codepoint associated with the TCI field corresponds to the plurality of TCI states.

9. The method of claim 8, wherein each of information associated with the second antenna port indication includes an entry corresponding to DMRS port index 1000, 1002 and 1003.

10. The method of claim 6, wherein each of the plurality of TCI states corresponds to different code division multiplexing (CDM) group, in case that a codepoint indicated by the TCI field corresponds to the plurality of TCI states and identified DMRS ports correspond to a plurality of CDM groups.

11. A terminal in a communication system, the terminal comprising:
  a transceiver; and
  a processor configured to:
    receive, from a base station via the transceiver, configuration information associated with a demodulation reference signal (DMRS) for receiving data;
    receive, from the base station, control information including an indicator associated with at least one DMRS port and a transmission configuration indication (TCI) field;
    identify a DMRS port allocated to the terminal based on the configuration information, the indicator and whether at least one codepoint associated with the TCI field corresponds to a plurality of TCI states; and
    receive, from the base station, the data based on the identified DMRS port.

12. The terminal of claim 11, wherein the DMRS port allocated to the terminal is identified based on a first antenna port indication, in case that all the codepoint associated with the TCI field corresponds to up to one TCI state.

13. The terminal of claim 11, wherein the DMRS port allocated to the terminal is identified based on a second antenna port indication, in case that at least one codepoint associated with the TCI field corresponds to the plurality of TCI states.

14. The terminal of claim 13, wherein each of information associated with the second antenna port indication includes an entry corresponding to DMRS port index 1000, 1002 and 1003.

15. The terminal of claim 11, wherein each of the plurality of TCI states corresponds to different code division multiplexing (CDM) group, in case that a codepoint indicated by the TCI field corresponds to the plurality of TCI states and identified DMRS ports correspond to a plurality of CDM groups.

16. A base station in a communication system, the base station comprising:
  a transceiver; and
  a processor configured to:
    transmit, to a terminal via the transceiver, configuration information associated with a demodulation reference signal (DMRS) for transmitting data;
    transmit, to the terminal, control information including an indicator associated with at least one DMRS port and a transmission configuration indication (TCI) field;
    identify a DMRS port allocated to the terminal based on the configuration information, the indicator and whether at least one codepoint associated with the TCI field corresponds to a plurality of TCI states; and
    transmit, to the terminal, the data based on the identified DMRS port.

17. The base station of claim 16, wherein the DMRS port allocated to the terminal is identified based on a first antenna port indication, in case that all the codepoint associated with the TCI field corresponds to up to one TCI state.

18. The base station of claim 16, wherein the DMRS port allocated to the terminal is identified based on a second antenna port indication, in case that at least one codepoint associated with the TCI field corresponds to the plurality of TCI states.

19. The base station of claim 18, wherein each of information associated with the second antenna port indication includes an entry corresponding to DMRS port index 1000, 1002 and 1003.

20. The base station of claim 16, wherein each of the plurality of TCI states corresponds to different code division multiplexing (CDM) group, in case that a codepoint indicated by the TCI field corresponds to the plurality of TCI states and identified DMRS ports correspond to a plurality of CDM groups.

* * * * *